(12) United States Patent
Da Silva et al.

(10) Patent No.: US 11,463,927 B2
(45) Date of Patent: Oct. 4, 2022

(54) CHANNEL STATE INFORMATION REFERENCE SIGNAL (CSI-RS) CONFIGURATION ACTIVATION BEFORE HANDOVER COMPLETION

(71) Applicant: Telefonaktiebolaget LM Ericsson (publ), Stockholm (SE)

(72) Inventors: Icaro L. J. Da Silva, Solna (SE); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 386 days.

(21) Appl. No.: 16/610,596

(22) PCT Filed: May 4, 2018

(86) PCT No.: PCT/IB2018/053135
§ 371 (c)(1),
(2) Date: Nov. 4, 2019

(87) PCT Pub. No.: WO2018/203308
PCT Pub. Date: Nov. 8, 2018

(65) Prior Publication Data
US 2020/0068463 A1    Feb. 27, 2020

Related U.S. Application Data

(60) Provisional application No. 62/502,242, filed on May 5, 2017.

(51) Int. Cl.
*H04L 1/00* (2006.01)
*H04L 5/00* (2006.01)
(Continued)

(52) U.S. Cl.
CPC ....... *H04W 36/0094* (2013.01); *H04L 1/0026* (2013.01); *H04L 5/0051* (2013.01);
(Continued)

(58) Field of Classification Search
CPC ..... H04B 7/063; H04B 7/0695; H04L 1/0026; H04L 5/0051; H04W 16/28;
(Continued)

(56) References Cited

U.S. PATENT DOCUMENTS

2010/0296472 A1    11/2010 Lee et al.
2016/0037425 A1    2/2016 Van Lieshout et al.
(Continued)

FOREIGN PATENT DOCUMENTS

WO    WO-2012139456 A1 *    10/2012    ...... H04W 36/00837

OTHER PUBLICATIONS

English language translation of WO2012139456A1. (Year: 2012).*
(Continued)

*Primary Examiner* — Melvin C Marcelo
*Assistant Examiner* — Natali Pascual Peguero
(74) *Attorney, Agent, or Firm* — Christopher & Weisberg, P.A.

(57) ABSTRACT

A method, network node and wireless device are provided. A wireless device for wireless communications is provided. The wireless device includes processing circuitry including a processor and a memory, the memory configured to store instructions that, when executed by the processor, configure the wireless device to: receive activation information before a completion of a handover of the wireless device from a serving network node to a target network node where the activation information indicates a first set of a plurality of sets of reference signal configurations has been activated for reference signal feedback, and provide reference signal feedback based on the first set of the plurality of sets of reference signal configurations.

30 Claims, 17 Drawing Sheets

(51) Int. Cl.
  *H04W 16/28* (2009.01)
  *H04W 36/00* (2009.01)
  *H04W 36/08* (2009.01)
  *H04W 72/04* (2009.01)
  *H04W 74/08* (2009.01)

(52) U.S. Cl.
  CPC ....... *H04W 16/28* (2013.01); *H04W 36/0058* (2018.08); *H04W 36/08* (2013.01); *H04W 72/046* (2013.01); *H04W 74/0833* (2013.01)

(58) Field of Classification Search
  CPC ......... H04W 36/0058; H04W 36/0094; H04W 36/08; H04W 72/046; H04W 74/0833
  See application file for complete search history.

(56) References Cited

U.S. PATENT DOCUMENTS

2016/0142189 A1* 5/2016 Shin ............... H04L 5/0048
                                                370/329
2018/0227031 A1* 8/2018 Guo ............... H04B 7/0695

OTHER PUBLICATIONS

European Communication Pursuant to Article 94(3) EPC dated Nov. 4, 2020 issued in European Patent Application No. 18 727 880.9, consisting of 5 pages.

3GPP TS 36.321 V14.3.0 (Jun. 2017); 3rd Generation Partnership Project; Technical Specification Group Access Network; Evolved Universal Terrestrial Radio Access (E-UTRA); Medium Access Control (MAC) Protocol Specification (Release 14), consisting of 107 pages.

3GPP TS 36.331 V14.3.0 (Jun. 2017); 3rd Generation Partnership Project; Technical Specification Group Radio Access Network; Evolved Universal Terrestrial Radio Access (E-UTRA); Radio Resource Control (RRC); Protocol Specification (Release 14), consisting of 745 pages.

International Search Report and Written Opinion of the International Searching Authority dated Aug. 16, 2018 issued in PCT Application No. PCT/IB2018/053135, consisting of 16 pages.

International Preliminary Report on Patentability dated May 23, 2019 issued in PCT Application No. PCT/IB2018/053135, consisting of 37 pages.

3GPP TSG RAN WG1 Meeting #82, R1-154274, Beijing, China; Aug. 24-28, 2015; Agenda Item: 7.2.5.2.2; Source: LG Electronics; Title: "Beamformed CSI-RS Related Enhancements Base on the Identified Approaches"; Document for: Discussion and Decision, consisting of 7 pages.

3GPP TSG RAN WG1 Meeting #88, R1-170xxxx, Spokane, USA; Apr. 3-7, 2017; Agenda Item: 8.1.2.4.1; Source: Samsung; Title: "CSI-RS for Beam Management"; Document for: Discussion and Decision, consisting of 7 pages.

3GPP TSG-RAN WG2 Meeting #97-bis; R2-1703257; Spokane, USA; Apr. 3-7, 2017; Agenda Item: 10.4.1.3; Source: Samsung; Title: "Use of CSI RS Based Measurements in Connected"; Document for: Discussion and Decision, consisting of 5 pages.

* cited by examiner

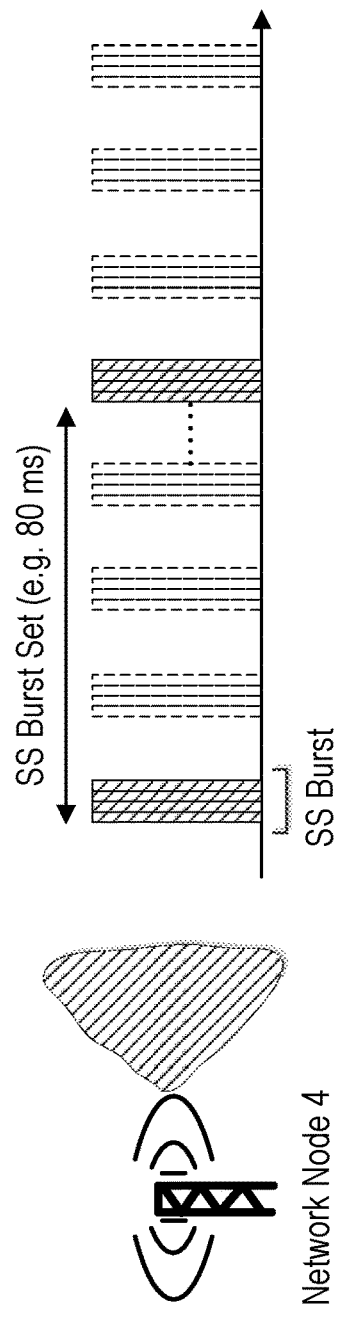
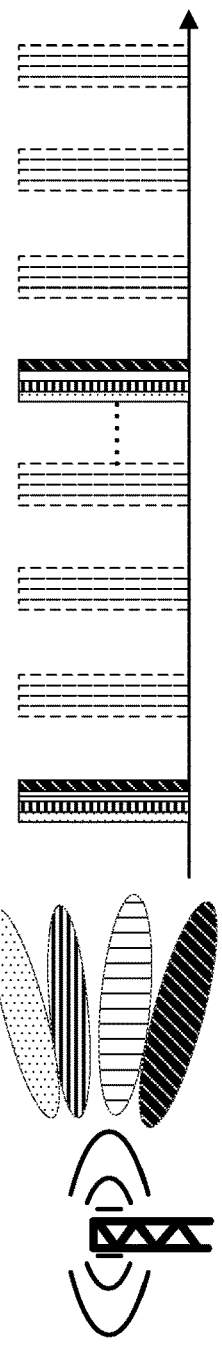
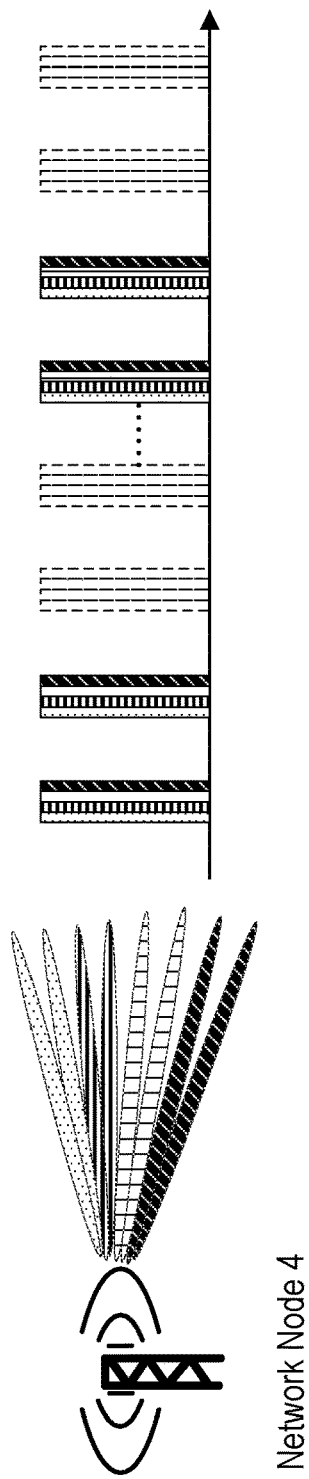
FIG. 3a
FIG. 3b
FIG. 3c

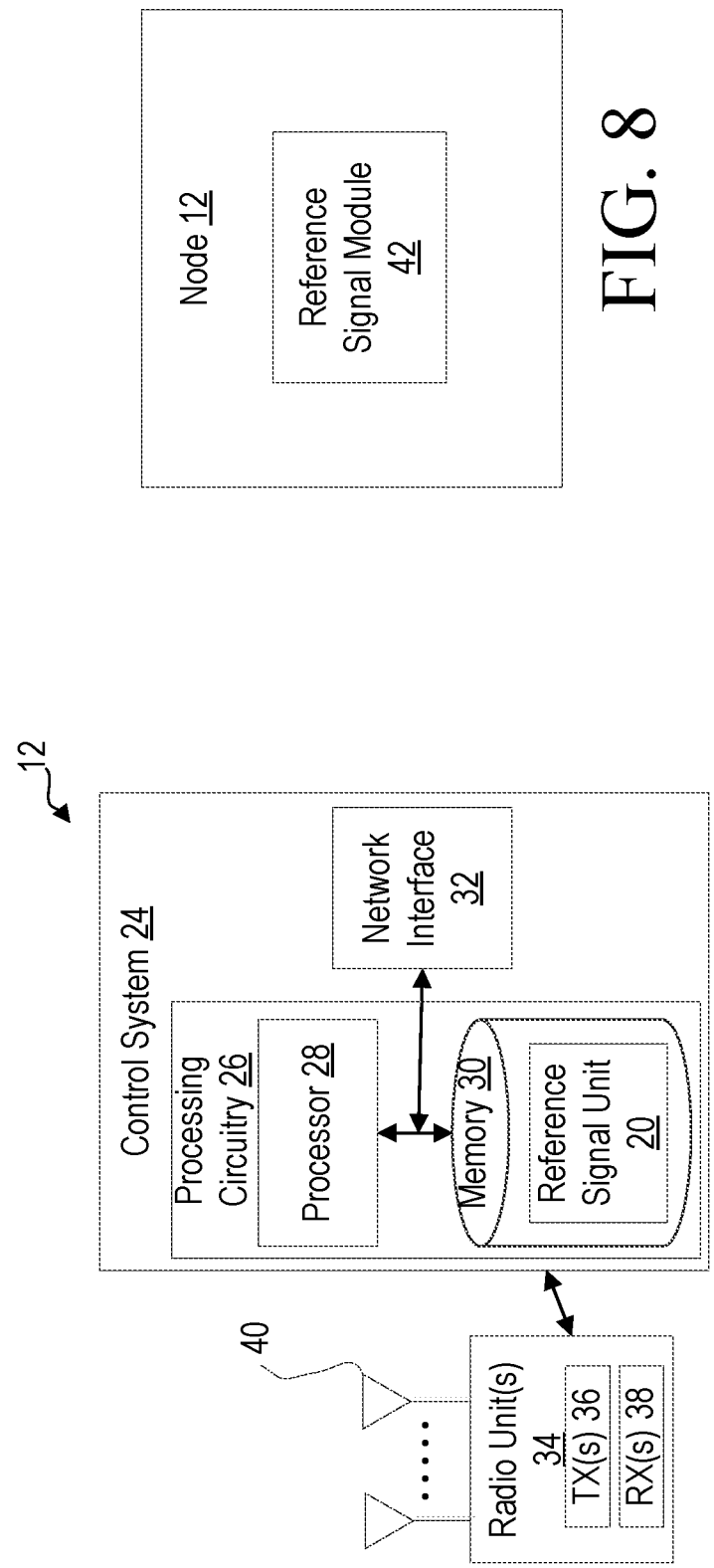

CHANNEL STATE INFORMATION REFERENCE SIGNAL (CSI-RS) CONFIGURATION ACTIVATION BEFORE HANDOVER COMPLETION

CROSS-REFERENCE TO RELATED APPLICATIONS

This application is a Submission Under 35 U.S.C. § 371 for U.S. National Stage Patent Application of International Application No.: PCT/IB2018/053135, filed May 4, 2018 entitled "CHANNEL STATE INFORMATION REFERENCE SIGNAL (CSI-RS) CONFIGURATION ACTIVATION BEFORE HANDOVER COMPLETION," which claims priority to U. S. Provisional Application No.: 62/502242, filed May 5, 2017, entitled "OPTIMIZED CSI-RS CONFIGURATION ACTIVATION UPON HANDOVER," the entireties of both of which are incorporated herein by reference.

TECHNICAL FIELD

The disclosure relates generally to telecommunications. Certain embodiments relate more particularly to concepts such beamforming and reporting of Channel State Information Reference Signal (CSI-RS).

INTRODUCTION

In wireless communication standards such as Long Term Evolution (LTE), until LTE Release 13, all reference signals (e.g., Cell-Specific Reference Signal (CRS) and CSI-Reference Signal (RS)) that a wireless device used for Channel State Information (CSI) calculation were non-precoded such that the wireless device was able to measure the raw channel and calculated feedback including a preferred precoding matrix based on the non-precoded signals. As the number of transmit/transmission (Tx) antennas increases, the amount of feedback becomes larger. In wireless communication standards such as LTE Release-10, when support for 8Tx closed loop precoding was provided, a double codebook approach was provided where the wireless device first selects a wideband coarse precoder and then, per subband, a second codeword. Closed loop generally refers to systems that may require channel knowledge at a transmitter. Another possible approach is that the network beam forms, i.e., beamforming, the reference signal and the wireless device calculates feedback. This approach was incorporated in some wireless communication standards such as LTE Release 13. One option for the Full Dimension Multiple Input Multiple Output (FD-MIMO) is described below.

In some wireless communication standards such as LTE Release 13 FD-MIMO supports an enhanced CSI-RS reporting referred to as Class B for beamformed CSI-RS. A LTE Radio Resource Control (RRC) connected (RRC_CONNECTED) wireless device can be configured with K beams (where 8>K>1) where a port number may be 1, 2, 4 or 8 for each beam. For CSI feedback purposes (Pre-coding Matrix Indicator (PMI), Rank Indicator (RI) and Channel Quality Indicator (CQI)) there is a CSI-RS Resource Indicator per CSI-RS as illustrated in FIG. 1 that is a communication system 2 showing multi-beam scenarios. The communication system includes network node 4 in communication with wireless device 6. The wireless device 6 reports a CSI-RS index (CRI) to indicate the preferred beam where: the CRI is wideband, the RI/CQI/PMI may be based on legacy codebook (i.e., wireless communication standards such as LTE Release 12) and a CRI reporting period is an integer multiple of the RI.

For some wireless communication standards such as LTE Release 14 enhanced FD-MIMO (eFD-MIMO), two different types of aperiodic CSI-RS were introduced. The CRS-RS resources are configured for the wireless device 6 as described in some wireless communication standards such as LTE Release 13, and if the set of K CSI-RS resources is configured to work as aperiodic, or semi-persistent, the wireless device 6 waits for Medium Access Control (MAC) Control Element (CE) activation for N out of K CSI-RS resources. For aperiodic CSI-RS, the wireless device 6 waits for, in addition to MAC CE, a Downlink Control Information (DCI) activation of the CSI-RS resource before reporting. For semi-persistent CSI-RS, the wireless device 6 considers the CSI-RS activated after receiving the MAC CE.

The MAC CE activation/deactivation command is specified in some communication standards such as in Third Generation Partnership Project (3GPP) Technical Specification (TS) 36.321, where the MAC CE activation/deactivation command is as described below.

The network/network node 4 may activate and deactivate the configured CSI-RS resources of a serving cell provided by a serving network node 4 by sending the Activation/Deactivation of CSI-RS resources MAC control element described below. The configured CSI-RS resources are initially deactivated upon configuration of the CSI-RS resources and after a handover of the wireless device 6.

For Activation/Deactivation of CSI-RS resources, a MAC control element is identified by a MAC Protocol Data Unit (PDU) subheader with Logical Channel ID (LCID) which may be specified in a predetermined table. The MAC PDU has a variable size as the number of configured CSI process (N) may vary as illustrated in FIG. 2 where FIG. 2 is a block diagram of an activation/deactivation of CSI-RS resources MAC control elements. Activation/Deactivation CSI-RS command activates or deactivates CSI-RS resources for a CSI process. Activation/Deactivation of CSI-RS resource MAC control element(s) apply to the serving cell on which the wireless device 6 receives the Activation/Deactivation of CSI-RS resources MAC control element.

The Activation/Deactivation of CSI-RS resources MAC control elements may be defined as follows:
Ri: this field indicates the activation/deactivation status of the CSI-RS resources associated with CSI-RS-ConfigNZPId i for the CSI-RS process. The Ri field is set to "1" to indicate that CSI-RS resource associated with CSI-RS-ConfigNZPId i for the CSI-RS process may be activated. The Ri field is set to "0" to indicate that the CSI-RS-ConfigNZPId i may be be deactivated.

The MAC activation was introduced in some wireless communication standards such as LTE to be able to configure more CSI-RS resources for a wireless device 6 where the wireless device 6 is able to support feedback as the MAC CE would selectively activate up to max CSI-RS resources supported. Then, without the need to reconfigure by RRC, the network or network node 4 may activate another set among the resources configured for the wireless device 6.
Beamforming in New Radio (NR)

For some wireless communication standards such as NR, all reference signals may be beamformed. In NR, the synchronization sequences (NR-Primary Synchronization Signal (PSS)/NR-Secondary Synchronization Signal (SSS)) and Physical Broadcast Channel (PBCH) which includes Demodulation RS (DMRS) may constitute or correspond to a Synchronization Signal (SS) Block. A Radio Resource Control (RRC) connected (RRC_CONNECTED) wireless device that is trying to access a target cell that is provided by a target network node 4 may assume that the SS Block may be transmitted in the form of repetitive bursts of SS Block transmissions (referred to as "SS Burst"), where such a burst consists of a number of SS Block transmissions following close after each other in time. Furthermore, a set of SS Bursts may be grouped together (referred to as "SS Burst Set"), where the SS Bursts in the SS Burst Sets may be assumed to have some relation to each other. Both SS Bursts and SS Burst Sets may have their respective periodicities predefined. In the single beam scenarios, the network/ network node may configure time-repetition within one SS Burst in a wide beam. In multi-beam scenarios, at least some of these signals and physical channels (e.g., SS Block) may be transmitted in multiple beams, which could be done in different manners depending on network implementation, as shown in FIGS. 3a-c, where FIGS. 3a-c are block diagrams of examples of different configurations of an SS burst set. FIG. 3a illustrates a time-repetition with one SS burst in a wide beam. FIG. 3b is a beam-sweeping of a small number of beams using only one SS burst in the SS burst set, and FIG. 3c is a beam-sweeping of a large number of beams using more than one SS burst in the SS burst set to form a complete sweep.

A network vendor/operator may implement either one of these three alternative choices illustrated in FIGS. 3a-c. The choice may depend on a tradeoff between i) the overhead caused by transmitting periodic and narrow beam sweepings vs. ii) the delays and signalling needed to configure the wireless device to find a narrow beam for Physical Downlink Shared Channel (PDSCH)/Physical Downlink Control Channel (PDCCH). The implementation shown in FIG. 3a prioritizes i), while the implementation shown in FIG. 3c prioritizes ii). FIG. 3b is an intermediate case, where a sweeping of wide beams is implemented. In the case of FIG. 3b, the number of beams to cover the cell is reduced, but in some cases an additional refinement may be needed for narrow gain beamforming of PDSCH.

The network may provide cell coverage with a low number of beams for RRC IDLE mode (RRC_IDLE) coverage which may imply a fairly low number of SS Blocks per Burst Set. Hence, once the wireless device 6 accesses a cell, either via state transition to RRC_CONNECTED or via handovers, further beam management procedures may need to be configured and Downlink (DL) beams to be used for the transmission of Physical Downlink Control Channel (PDCCH)/PDSCH may need to be further modified. For that purpose, defining in a wireless communication standards such as NR a CSI-RS framework is under investigation, which to a certain extent may be similar to LTE, for beam management and CSI acquisition procedures or transmission/reception point (TRP) recognition in scenarios with the same cell ID. The same cell ID scenario may be equivalent to one of the LTE coordinated multipoint (CoMP) scenarios where the concept of transmission point (TP) is provided. A TP/TRP may correspond to a remote radio head (RRH) where all RRHs may have the same cell ID within one cell area. In other words, all these RRHs having the same cell ID may all send the same Cell-Specific Reference Signal (CRS) (e.g., in LTE) or SSB (e.g., in NR) and therefore CSI-RS may be the only manner for the wireless device 6 to distinguish among TP/TRP, e.g., RRHs.

FIG. 4 is a signaling diagram of an existing type of message exchange. In some wireless communication standards such as LTE, the information element (IE) of a dedicated radio resource configuration (radioResourceConfigDedicated) includes the CSI configuration. In some wireless communication standards such as LTE, the configured CSI-RS resources are initially deactivated upon configuration and after a handover. Thus, after the RRC connection setup complete message (RRConnectionSetupComplete) message which follows the random access messages, the wireless device 6 may be able to receive the MAC activation CE (MAC CE for activation) and start sending CSI feedback to network.

Thus, the wireless device 6 is applying CSI (e.g., PMI, RI, CQI) reporting configuration after the RRC connection setup complete message. Such delay may lead to non-seamless mobility, especially in the case where the wireless device 6 is using high data rate services before the handover in the serving network node 4, due to the wireless device 6 using a narrow beam in the serving cell provided by the serving network node 4 before the handover execution.

FIG. 5 is a diagram of an SS block for two SS block beams. The SS Burst Set may either be transmitted in wide beams to cover the whole cell or in a single beam. In the case where the SS Burst Set is transmitted in a single wide beam, the handover command contains a Random Access Channel (RACH) configuration for the target cell. Once the wireless device 6 receives the handover command, the wireless device 6 may access the target and a random access procedure may be triggered by the wireless device 6 sending a random access preamble. If directional reciprocity is present in the system, the target cell provided by the target network node 4 may transmit the random access response (RAR) either by beam sweeping in multiple directions covering the whole cell until the wireless device 6 detects and transmits the handover complete message or transmitting the RAR with time repetition (and expects the HO complete message).

In the case multiple beams are used to transmit the SS Burst Set, the handover command may contain multiple RACH configurations for the target cell, possibly associated with the SS Block beams or groups of SS Block beams from target cell. Once the wireless device 6 receives the handover command, the wireless device 6 may select a beam in the target cell, determine how the beam maps to the received RACH configuration per beam, and initiate a random access procedure by sending a random access preamble associated with a target cell beam or a group of beams.

Even without directional reciprocity being present or implemented, network implementation enables the target cell to transmit the RAR in the strongest downlink (DL) beam covering the wireless device 6 at least in part due to the mapping between RACH configuration (including the preamble) and the target cell DL beam. As used herein, "strongest" DL beam may refer to a DL beam with higher and/or lower signal characteristics than other DL beams, e.g., higher power and/or lower noise, etc.

SUMMARY

Some embodiments advantageously provide a method and system for activation of CSI-RS configurations before completion of a handover.

Some embodiments enable the CSI-RS resource activation before a handover (HO) completion between the network node and a wireless device communicating over a radio interface. In some embodiments, a method is described of initiating the MAC CE command when the target node configures the wireless device. When a target configures a wireless device with aperiodic or semi-persistent CSI-RS in the handover command, the MAC CE or equivalent information is included, that is, a) in the Handover (HO) command (RRC configuration with mobility configuration or equivalent in NR); and/or b) in random access message 2 (msg2) or message 4 (msg4).

In some embodiments, a MAC CE definition is provided. The MAC CE may be as defined such that each bit in the MAC CE activates a single resource. Alternatively, the MAC CE may be defined such that one bit inside an octet points to a set of CSI-RSs, i.e., one bit of the octet activates multiple CSI-RS resources. The MAC CE definition may be fixed such that one bit points to all CSI-RSs mapping to a specific SSB, or, to all CSI-RSs mapping to a separate set of lists of CSI-RS configurations where each bit in the MAC CE points to one set which includes a list of given CSI-RS configurations. Note that this definition for the MAC CE can also be used in wireless device operation other than during HO.

Some embodiments described herein help addresses at least some of the shortcomings associated with existing techniques and technologies, as described below. One problem that some embodiments described herein address is the potential delay to access a narrow beam in a target cell after handover execution. For example, in some wireless communication standards such as LTE, before transmitting PDSCH (and/or PDCCH) in a narrow beam, the wireless device may need to report narrow beam level information. In some wireless communication standards such as LTE, this reporting of narrow beam level information to the target network node corresponds to CSI, associated with configured CSI-RS resource(s). In a handover situation, the target network node can configure, in the HO command, a set of CSI-RS resources for CSI reporting, similar to any other RRC configuration. In some wireless communication standards such as LTE, the framework provide for the activation dictates that the activation may occur only after the HO is completed (i.e., after a random access procedure and after the wireless device sends the HO complete message).

In some wireless communication standards such as NR, there are two types of reference signals that may be beamformed, SSB and CSI-RS. Sometimes, SSB beams are wider or as wide as the beamforming for CSI-RS. Thus, there may be multiple CSI-RS resources per SSB configured by the network node in HO and these may be configured as aperiodic or semi-persistent in order to be activated after HO since, after HO, the target cell knows to which SSB the wireless device has entered.

The NR HO procedure may include a RACH procedure with four messages including RACH message 2 (msg 2) and message 4 (msg 4), described herein. MAC CE activation for aperiodic or semi persistent CSI-RS resources are configured for the wireless device.

Some wireless communication standards such as 3GPP TS 36.331 are described below.

Reception of an RRC Connection Reconfiguration Message (RRCConnectionReconfiguration) including Mobility Control Information (mobilityControlInfo) by the Wireless Device (Handover (HO))

If the RRCConnectionReconfiguration message includes the mobilityControlInfo and the wireless device is able to comply with the configuration included in this message, the wireless device may:

1>stop timer T310, if running;
1>stop timer T312, if running;
1>start timer T304 with the timer value set to t304, as included in the mobilnyControlInfo;
1>stop timer T370, if running;
1>if the carrier frequency (carrierFreq) is included:
   2>consider the target primary Cell (PCell) to be one on the frequency indicated by the carrierFreq with a physical cell identity indicated by the physical cell ID of the target cell (targetPhysCellId);
1>else:
   2>consider the target PCell to be one on the frequency of the source PCell with a physical cell identity indicated by the targetPhysCellId;
. . .
1>configure lower communication layers in accordance with the received radio resource configuration common message (radioResourceConfigCommon);
. . .
1>if the RRC connection reconfiguration message (RRCConnectionReconfiguration) includes the radio resource configuration dedicated information (radioResourceConfigDedicated):
   2>perform a radio resource configuration procedure;
. . .
1>if the RRCConnectionReconfiguration message includes the measurement configuration information (measConfig):
   2>perform a measurement configuration procedure;
. . .
1>submit a RRC connection reconfiguration complete message (RRCConnectionReconfigurationComplete) to lower communication layers for transmission;
1>if MAC successfully completes the random access procedure; or
1>if MAC indicates the successful reception of a Physical Downlink Control Channel (PDCCH) transmission addressed to Cell Radio Network Temporary Identifier (C-RNTI):
   2>stop timer T304;
   2>release uplink configuration information (ul-ConfigInfo), if configured;
   2>apply the parts of the Channel Quality Indicator (CQI) reporting configuration, the scheduling request configuration and the sounding RS configuration that do not require the wireless device to know the system frame number (SFN) of the target Primary Cell (PCell), if any;
   2>apply the parts of the measurement and the radio resource configuration that require the wireless device to know the SFN of the target PCell (e.g. measurement gaps, periodic Channel Quality Indicator (CQI) reporting, scheduling request configuration, sounding RS configuration), if any, upon acquiring the SFN of the target PCell;

In some wireless communication standards such as LTE, the information element (IE) radioResourceConfigDedicated contains the CSI configuration, as described in the above. In some wireless communication standards such as LTE, it may be specified for the MAC CE activation that the configured CSI-RS resources are initially deactivated upon configuration and after a handover. Thus, reception of the MAC CE for activation and the initiation of the sending of the CSI feedback to the network occurs after the RRC connection setup complete message (RRCConnectionSetupComplete), i.e., after handover is complete, which follows the random access messages of the random access procedure.

The wireless device may apply CSI (e.g., PMI, RI, CQI) reporting configuration after the random access procedure. This delay in applying the CSI reporting configuration may lead to non-seamless mobility especially in the case where the wireless device is using high data rate services before the handover from the serving network node (i.e., gNodeB) since the wireless device is using a narrow beam in the serving cell before the handover execution.

The SS Burst Set may either be transmitted in wide beams to cover an entire cell or in a single wide beam. In the case that the SS Burst Set is transmitted in a single wide beam, the handover command may contain a RACH configuration for the target cell. Once the wireless device receives the handover command from the serving node, the wireless device may access the target node where a random access procedure may be triggered by the wireless device by sending a random access preamble message to the target node. If directional reciprocity is present, the target node can transmit the random access response (RAR) by beam sweeping in multiple directions covering the whole cell until the wireless device detects and transmits the handover complete message, and/or can transmit the RAR with time repetition (where the target node may expect the HO complete message).

In the case where multiple beams are used to transmit the SS Burst Set, the handover command may contain multiple RACH configurations for the target network node, possibly associated with the SS Block beams or groups of SS Block beams from target network node. Once the wireless device receives the handover command, the wireless device may: select a beam in the target node, determine how the wireless device maps to the received RACH configuration per beam, and initiate a random access procedure by sending a random access preamble message associated with a target node beam or a group of beams. Even without directional reciprocity being present, the target cell is able to transmit the RAR in the strongest DL beam covering the wireless device based on the mapping between RACH configuration (including the preamble) and the target cell DL beam.

Some embodiments described herein may provide potential benefits compared to existing systems and technologies. One such benefit is that, if the activation command can be provided before after HO completion, the activation of the CSI-RS resource and therefore usage of the beam represented by the CSI-RS resource may occur faster than in existing system. For performing an activation decision, the target network node can use, for example, measurements forwarded from the source/serving network node or the random access channel procedure that the wireless device used when accessing the cell/target network node.

According to one aspect of the disclosure, a wireless device for wireless communications is provided. The wireless device includes processing circuitry including a processor and a memory, the memory configured to store instructions that, when executed by the processor, configure the wireless device to: receive activation information before a completion of a handover of the wireless device from a serving network node to a target network node, where the activation information indicates a first set of a plurality of sets of reference signal configurations has been activated for reference signal feedback, and provide reference signal feedback based on the first set of the plurality of sets of reference signal configurations.

According to one embodiment of this aspect, the memory stores further instructions that, when executed by the processor, further configure the wireless device to: receive, in a handover command message, the plurality of sets of reference signal configurations associated with the target network node, and in response to the receiving of the plurality of sets of reference signal configurations associated with the target network node, monitor for the activation information. According to one embodiment of this aspect, the memory stores further instructions that, when executed by the processor, further configured the wireless device to select a downlink antenna beam associated with the first set of the plurality of sets of the reference signal configurations, and synchronize with the target network node based on the selected downlink antenna beam associated with the first set of the sets of reference signal configurations where the activation information being based on the synchronization with the target network node. According to one embodiment of this aspect, the memory stores further instructions that, when executed by the processor, further configure the wireless device to provide at least one measurement report to the serving network node. The plurality of sets of reference signal configurations is confined in a spatial domain associated with the wireless device based on the at least one measurement report.

According to one embodiment of this aspect, the plurality of sets of reference signal configurations corresponds to a plurality of sets of channel state information reference signals, CSI-RS, configurations, each set of the plurality of sets of CSI-RS configurations corresponding to a plurality of CSI-RS. According to one embodiment of this aspect, the activation information is received during a Radio Access Channel, RACH, procedure with the target network node. According to one embodiment of this aspect, the activation information is associated with a Random Access Response, RAR, message and a Radio Resource Control, RRC, connection setup message.

According to one embodiment of this aspect, the activation information is a bit of a medium access control, MAC, control element, CE, byte, the bit of the MAC CE indicating the first set of the plurality of sets of reference signal configurations. According to one embodiment of this aspect, each bit of the MAC CE byte corresponds to a different set of the plurality of sets of reference signal configurations. According to one embodiment of this aspect, the activation information is received within a handover command message, the handover command message configured to allow the wireless device to access the target network node.

According to one embodiment of this aspect, the handover command message is received from the serving network node where the handover command message is received before an initiation of a Radio Access Channel, RACH, procedure with the target network node.

According to another aspect of the disclosure, a method for a wireless device for wireless communications is provided. Activation information is received before a completion of a handover of the wireless device from a serving network node to a target network node, the activation information indicating a first set of a plurality of sets of reference signal configurations has been activated for reference signal feedback. Reference signal feedback is provided based on the first set of the plurality of sets of reference signal configurations.

According to one embodiment of this aspect, the plurality of sets of reference signal configurations associated with the target network node are received in a handover command message, and in response to the receiving of the plurality of sets of reference signal configurations associated with the target network node, monitor for the activation information. According to one embodiment of this aspect, A downlink antenna beam associated with the first set of the plurality of sets of the reference signal configurations is selected. Synchronize with the target network node based on the selected downlink antenna beam associated with the first set of the sets of reference signal configurations where the activation information is based on the synchronization with the target network node. According to one embodiment of this aspect, at least one measurement report is provided to the serving network node. The plurality of sets of reference signal configurations are confined in a spatial domain associated with the wireless device based on the at least one measurement report.

According to one embodiment of this aspect, the plurality of sets of reference signal configurations corresponds to a plurality of sets of channel state information reference signals, CSI-RS, configurations where each set of the plurality of sets of CSI-RS configurations corresponds to a plurality of CSI-RS. According to one embodiment of this aspect, the activation information is received during a Radio Access Channel, RACH, procedure with the target network node. According to one embodiment of this aspect, the activation information is associated with a Random Access Response, RAR, message and a Radio Resource Control, RRC, connection setup message. According to one embodiment of this aspect, the activation information is a bit of a medium access control, MAC, control element, CE, byte, where the bit of the MAC CE indicates the first set of the plurality of sets of reference signal configurations.

According to one embodiment of this aspect, each bit of the MAC CE byte corresponds to a different set of the plurality of sets of reference signal configurations. According to one embodiment of this aspect, the activation information is received within a handover command message where the handover command message is configured to allow the wireless device to access the target network node. According to one embodiment of this aspect, the handover command message is received from the serving network node where the handover command message is received before an initiation of a Radio Access Channel, RACH, procedure with the target network node.

According to another aspect of the disclosure, a target network node for reference signal configuration activation before completion of a handover of a wireless device from a serving network node is provided. The target network node includes processing circuitry including a processor and a memory, the memory configured to store instructions that, when executed by the processor, configure the target network node to: signal activation information before the completion of the handover where the activation information indicating a first set of a plurality of sets of reference signal configurations has been activated for reference signal feedback from the wireless device, and receive reference signal feedback from the wireless device based on the activation information.

According to one embodiment of this aspect, the memory stores further instructions that, when executed by the processor, further configure the target network node to: determine the plurality of sets of reference signal configurations, and transmit an indication of the plurality of sets of reference signal configurations for the wireless device where the plurality of sets of reference signal configurations are associated with a plurality of antenna beam directions provided by the target network node. According to one embodiment of this aspect, the memory stores further instructions that, when executed by the processor, further configure the target network node to receive measurement information associated with the wireless device from the serving network node. The determining of the plurality of sets of reference signal configurations is based on the measurement information where the plurality of sets of reference signal configurations are confined in a spatial domain associated with the wireless device.

According to one embodiment of this aspect, the memory stores further instructions that, when executed by the processor, further configure the target network node to: synchronize with the wireless device using a downlink antenna beam associated with the first set of the plurality of sets of reference signal configurations. The activation information indicates the first set of the plurality of sets of reference signal configurations has been activated for reference signal feedback from the wireless device. According to one embodiment of this aspect, each of the plurality of sets of reference signal configurations corresponds to a plurality of sets of channel state information reference signal, CSI-RS, configurations where each set of the plurality of sets of CSI-RS configurations corresponding to a plurality of CSI-RS.

According to one embodiment of this aspect, the activation information is a bit of a medium access control, MAC, control element, CE, byte, where the bit of the MAC CE indicating the first set of the plurality of sets of reference signal configurations. According to one embodiment of this aspect, each bit of the MAC CE byte corresponds to a different set of the plurality of reference signal configurations. According to one embodiment of this aspect, the signaling of the activation information is configured to occur during a Radio Access Channel, RACH, procedure with the target network node. According to one embodiment of this aspect, signaling the activation information corresponds to one of signaling a Random Access Response, RAR, message and signaling a Radio Resource Control, RRC, connection setup message.

According to one embodiment of this aspect, signaling of the activation information includes signaling the activation information to the serving network node for transmission to the wireless device in handover command message where the handover command message configured to allow the wireless device to access the target network node. According to one embodiment of this aspect, signaling of the activation information includes signaling the activation information as part of a radio resource configuration message.

According to aspect of the disclosure, a method for a target network node for reference signal configuration activation before completion of a handover of a wireless device from a serving network node is provided. Activation information is signaled before the completion of the handover where the activation information indicates a first set of a plurality of sets of reference signal configurations has been activated for reference signal feedback from the wireless device. Reference signal feedback from the wireless device is received based on the activation information.

According to one embodiment of this aspect, the plurality of sets of reference signal configurations are determined. An indication of the plurality of sets of reference signal configurations for the wireless device are transmitted where the plurality of sets of reference signal configurations are associated with a plurality of antenna beam directions provided by the target network node. According to one embodiment of this aspect, measurement information associated with the wireless device is received from the serving network node. The determining of the plurality of sets of reference signal configurations is based on the measurement information where the plurality of sets of reference signal configurations are confined in a spatial domain associated with the wireless device. According to one embodiment of this aspect, synchronize with the wireless device is perfumed using a downlink antenna beam associated with the first set of the plurality of sets of reference signal configurations. The activation information indicates the first set of the plurality of sets of reference signal configurations has been activated for reference signal feedback from the wireless device.

According to one embodiment of this aspect, each of the plurality of sets of reference signal configurations corresponds to a plurality of sets of channel state information reference signal, CSI-RS, configurations where each set of the plurality of sets of CSI-RS configurations corresponding to a plurality of CSI-RS. According to one embodiment of this aspect, the activation information is a bit of a medium access control, MAC, control element, CE, byte, where the bit of the MAC CE indicating the first set of the plurality of sets of reference signal configurations. According to one embodiment of this aspect, each bit of the MAC CE byte corresponds to a different set of the plurality of reference signal configurations.

According to one embodiment of this aspect, the signaling of the activation information is configured to occur during a Radio Access Channel, RACH, procedure with the target network node. According to one embodiment of this aspect, signaling the activation information corresponds to one of signaling a Random Access Response, RAR, message and signaling a Radio Resource Control, RRC, connection setup message. According to one embodiment of this aspect, signaling of the activation information includes signaling the activation information to the serving network node for transmission to the wireless device in handover command message where the handover command message configured to allow the wireless device to access the target network node. According to one embodiment of this aspect, signaling of the activation information includes signaling the activation information as part of a radio resource configuration message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 3a-c are block diagrams of examples of different configurations of an SS burst set;

FIG. 7 is a block diagram of an example network node in accordance with the principles of the disclosure;

FIG. 8 is a block diagram of another example network node in accordance with the principles of the disclosure;

DETAILED DESCRIPTION

Figure 1:
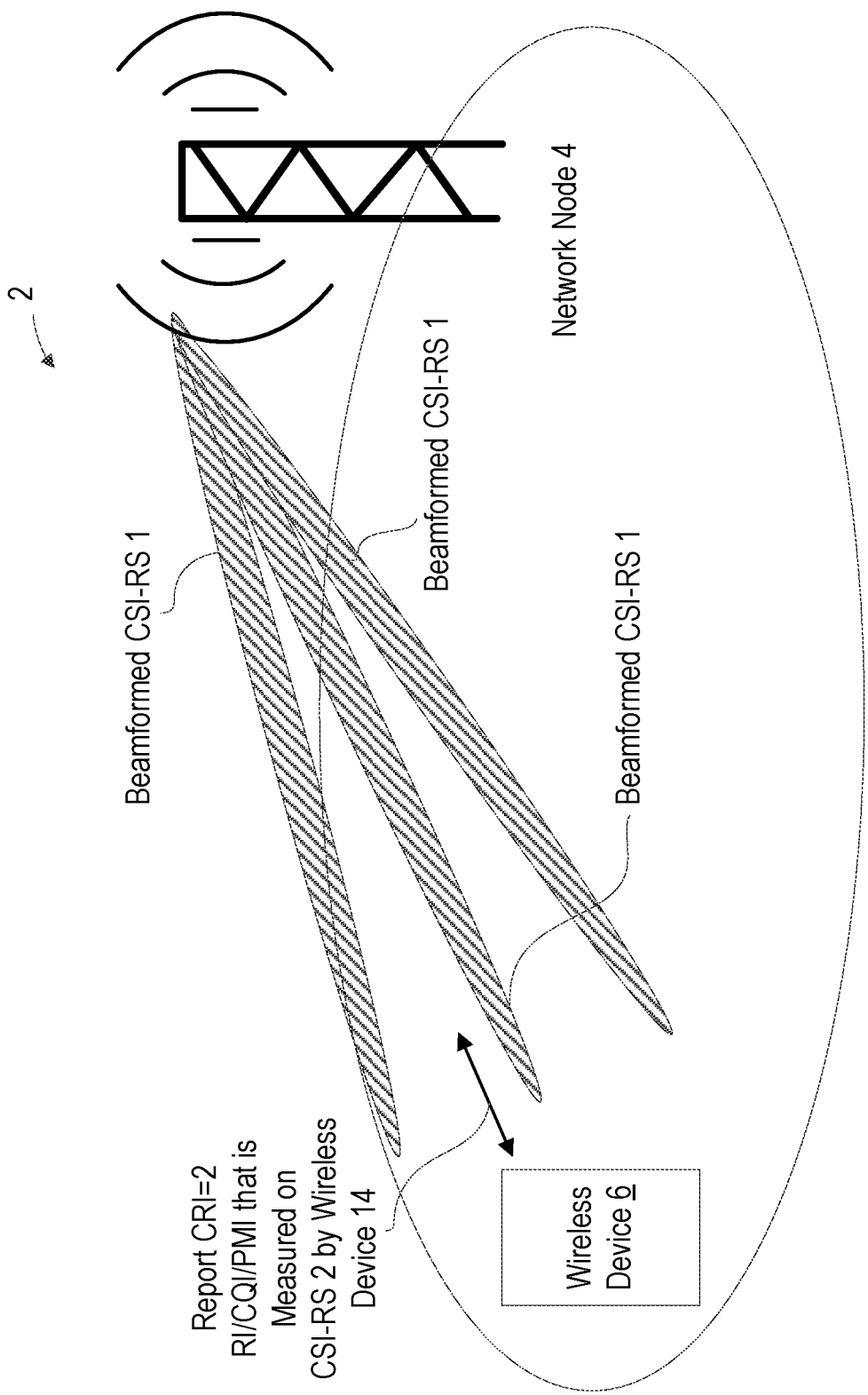
FIG. 1 is a block diagram of a communication system showing multi-beam scenarios.
Figure 2:
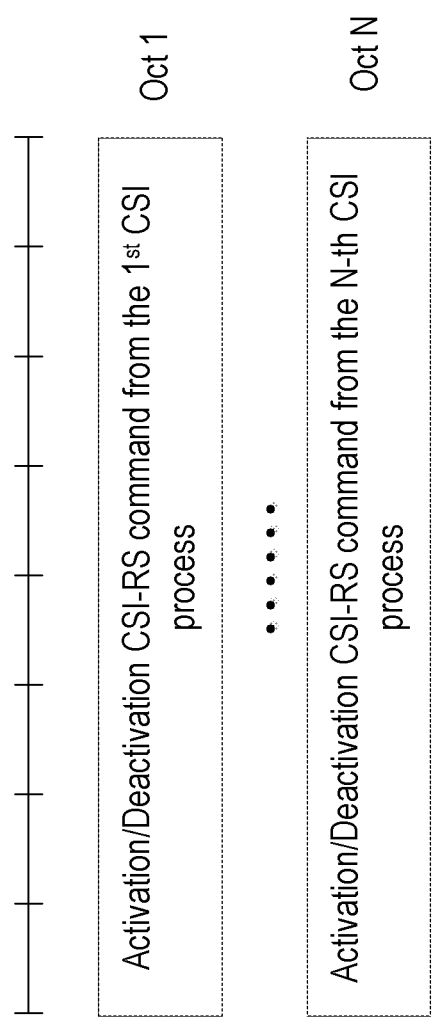
FIG. 2 is a block diagram of an activation/deactivation of CSI-RS resources MAC control elements.
Figure 4:
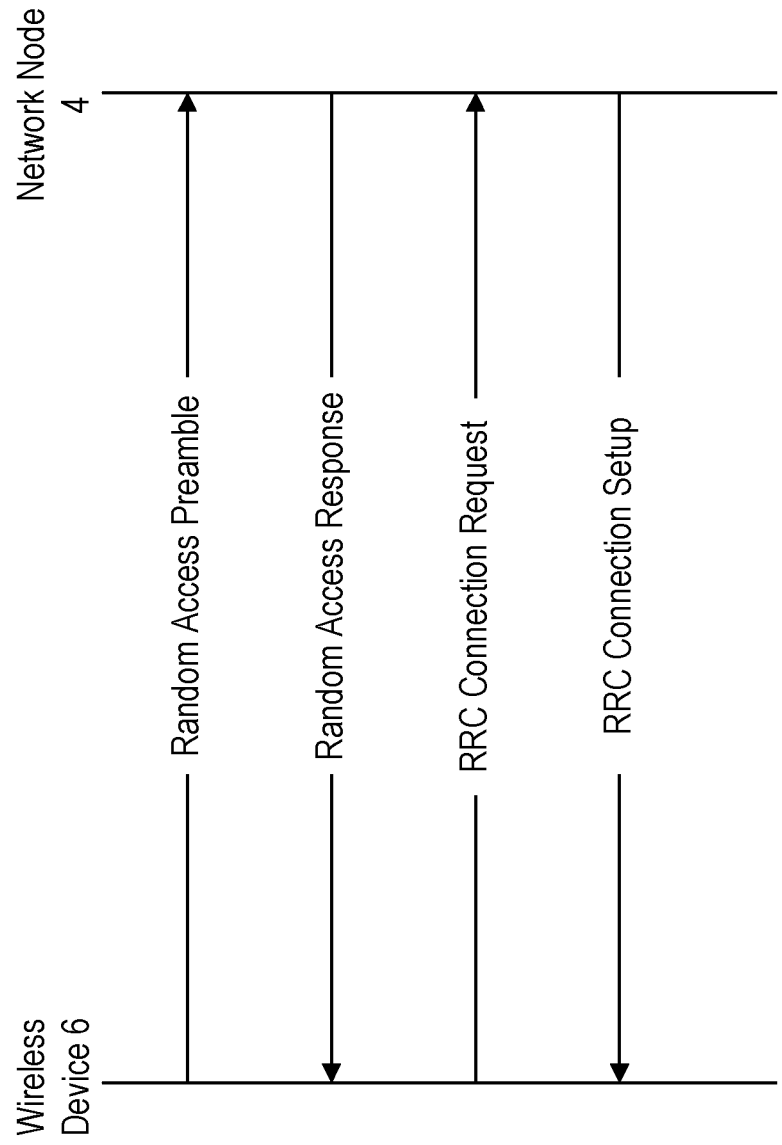
FIG. 4 is a signaling diagram of an existing type of message exchange.
Figure 5:
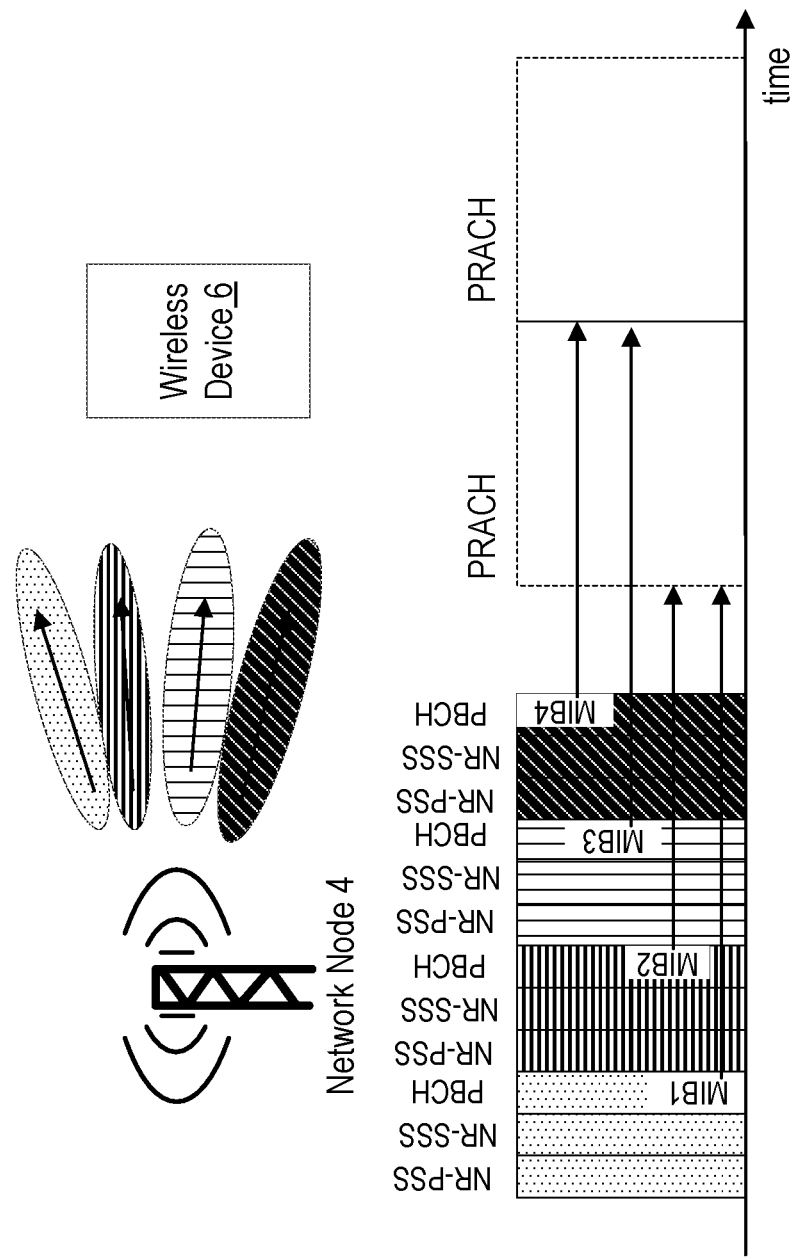
FIG. 5 is a diagram of an SS block for two SS block beams.

The following description presents various embodiments for activation of CSI-RS configurations before completion of a handover, thereby helping address at least part of the problems with existing systems. These embodiments are presented as teaching examples and are not to be construed as limiting the scope of the disclosed subject matter. For example, certain details of the described embodiments may be modified, omitted, or expanded upon without departing from the scope of the disclosed subject matter.

Before describing in detail exemplary embodiments, it is noted that the embodiments reside primarily in combinations of apparatus components and processing steps related to activation of CSI-RS configurations before completion of a handover. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may be capable of M-MIMO communication through wireless communication. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 6:
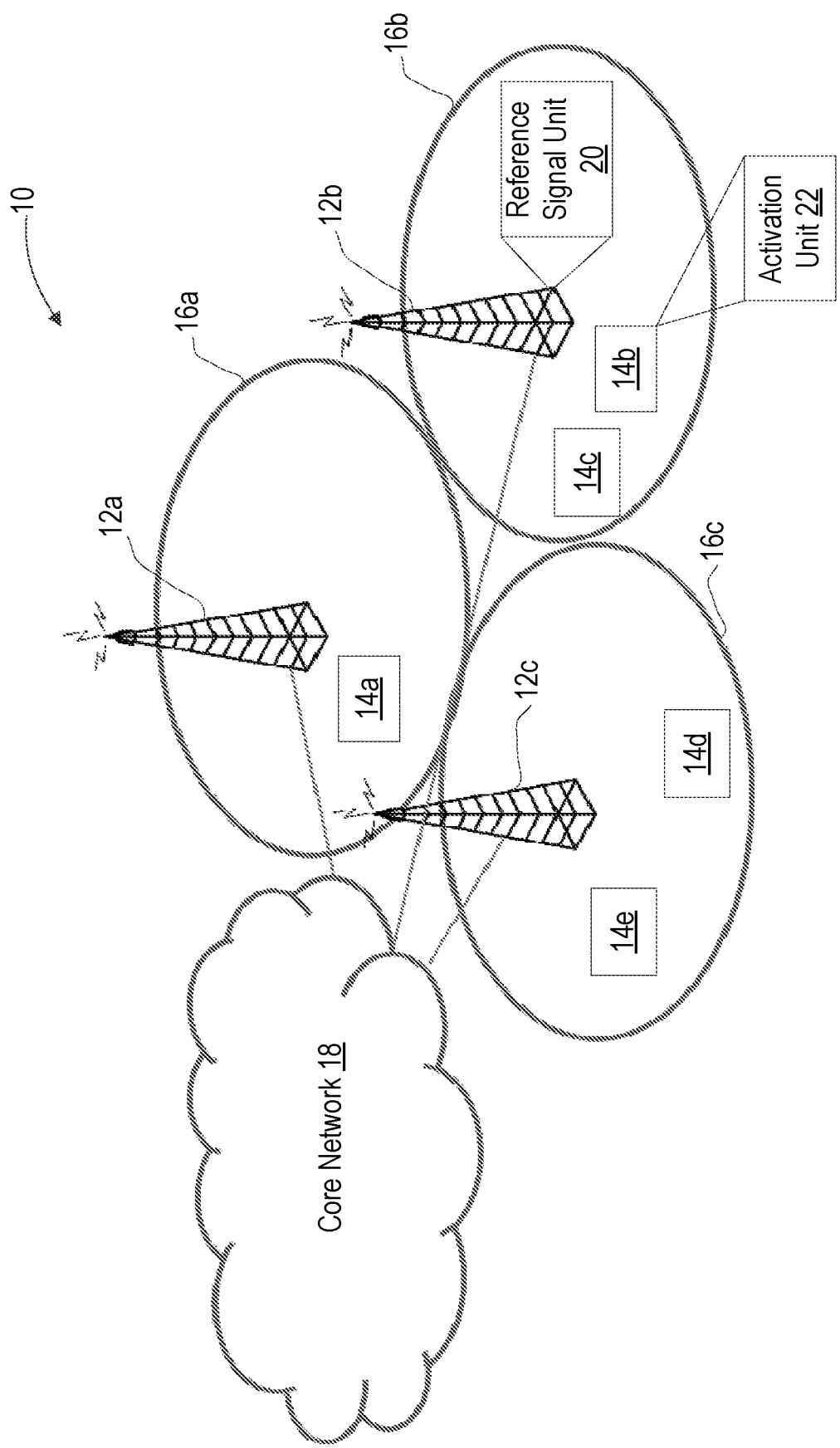
FIG. 6 a schematic diagram of a communication system in accordance with the principles of the disclosure.

Returning to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises the network nodes 12a-12c (e.g., radio access nodes, eNodeBs such as in LTE, gNBs such as in NR, or other base stations), and the wireless devices 14-14e (e.g., wireless communication devices, user equipments (UEs), machine type communication (MTC)/machine-to-machine (M2M) UEs). The system 10 is organized into the cells 16a-16c, which are connected to a core network 18 via corresponding network nodes 12. The network nodes 12 are capable of communicating with the wireless devices 14 along with any additional elements suitable to support communication between wireless communication devices or between a wireless communication device and another communication device (such as a landline telephone).

In one or more embodiments, the network node 12 includes the reference signal unit 20 for reference signal activation in accordance with the principles of the disclosure. In one or more embodiments, the wireless device 14 includes the activation unit 22 for wireless communications in accordance with the principles of the disclosure.

Figure 10:
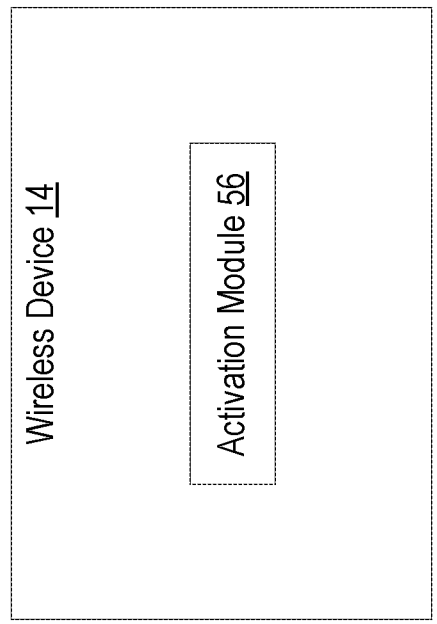
FIG. 10 is a block diagram of another example wireless device in accordance with the principles of the disclosure.
Figure 9:
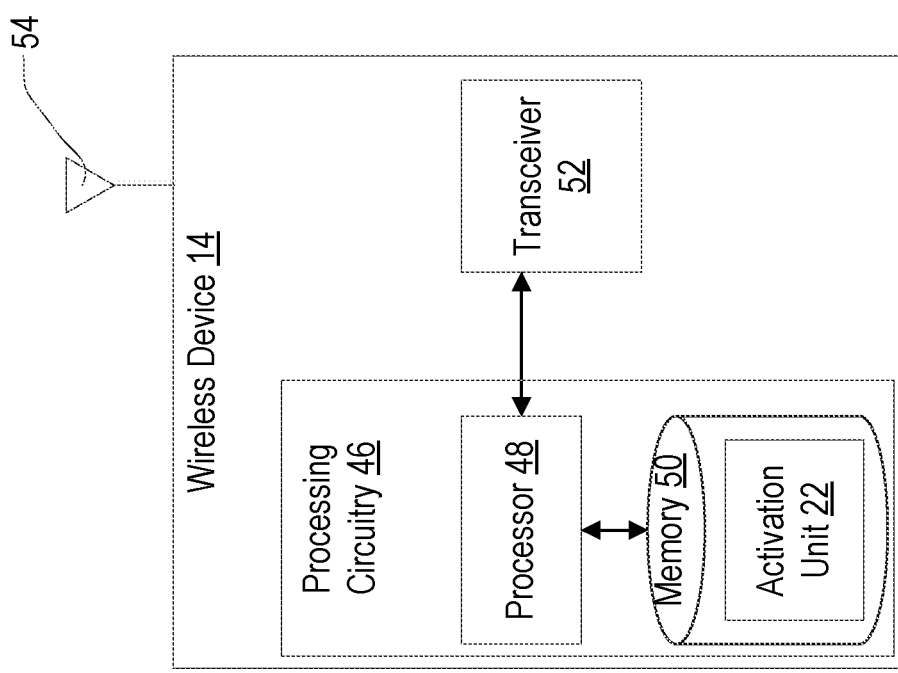
FIG. 9 is a block diagram of an example wireless device in accordance with the principles of the disclosure.

Although the wireless device 14 may represent communication devices that include any suitable combination of hardware and/or software, these wireless devices 14 may, in certain embodiments, represent devices such as those illustrated in greater detail by FIGS. 9 and 10. Similarly, although the illustrated network node 12 may represent a radio access node that include any suitable combination of hardware and/or software, these nodes may, in particular embodiments, represent devices such those illustrated in greater detail by FIGS. 7 and 8.

Referring to FIG. 7, the network node 12 includes the control system 24 that includes the processing circuitry 26. The processing circuitry 26 may include a processor 28 and a memory 30. In particular, in addition to or instead of a processor, such as a central processing unit, and memory, the processing circuitry 26 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 12 further has software stored internally in, for example, memory 30, or stored in external memory (e.g., database, storage array, network storage device, etc.) accessible by the network node 12 via an external connection. The software may be executable by the processing circuitry 26. The processing circuitry 26 may be configured to control any of the methods and/or processes described herein and/or to cause such methods, and/or processes to be performed, e.g., by the network node 12. The processor 28 corresponds to one or more processors 28 for performing the network node 12 functions described herein. The memory 30 is configured to store data, programmatic software code and/or other information described herein. In some embodiments, the software may include instructions that, when executed by the processor 28 and/or the processing circuitry 26, causes the processor 28 and/or processing circuitry 26 to perform the processes described herein with respect to the network node 12. For example, the processing circuitry 26 of the network node 16 may include the reference signal unit 20 configured for reference signal activation in accordance with the principles of the disclosure.

The network node 12 includes a network interface 32 and at least one radio unit 34 that includes at least one transmitter 36 and at least one receiver 38 coupled to at least one antenna 40. In some embodiments, the radio unit 34 is external to control system 24 and connected to the control system 24 via, e.g., a wired connection (e.g., an optical cable). However, in some other embodiments, the radio unit 34 and potentially the antenna 40 are integrated together with the control system 24. The processor 28 may operate to provide at least one function of the network node 12 as described herein. In some embodiments, the function(s) are implemented in software that is stored, e.g., in the memory 30 and executed by the processor 28.

In certain embodiments, some or all of the functionality described as being provided by a base station, a node B, an eNodeB, and/or any other type of network node 12 may be provided by the processor 28 executing instructions stored on a computer-readable medium, such as the memory 30 shown in FIG. 7. Alternative embodiments of the network node 12 may include additional components to provide additional functionality, such as the functionality described herein and/or related supporting functionality.

FIG. 8 is a block diagram of another embodiment of the network node 12 in accordance with the principles of the disclosure. The network node 12 includes at least one module such as the reference signal module 42 configured to perform one or more corresponding functions described herein. Examples of such functions include various method steps or combinations of method steps as described herein with reference to the network node 12 such as with respect to FIG. 12. In general, a module may comprise any suitable combination of software and/or hardware configured to perform the corresponding function. For instance, in some embodiments a module comprises software configured to perform a corresponding function when executed on an associated platform, such as that illustrated in FIG. 7.

FIG. 9 is a block diagram of one embodiment of a wireless device 14 in accordance with the principles of the disclosure. The wireless device 14 includes the processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, wireless device 14 may further comprise software, which is stored in, for example, the memory 50 at the wireless device 14, or stored in external memory (e.g., database, storage array, network storage device, etc.) accessible by the wireless device 14. The software may be executable by the processing circuitry 46. The software may include a client application. The client application may be operable to provide a service to a human or non-human user via the wireless device 14. The processing circuitry 46 may be configured to control any of the methods and/or processes described herein and/or to cause such methods, and/or processes to be performed, e.g., by the wireless device 14. The processor 48 corresponds to one or more processors 48 for performing the wireless device 14 functions described herein. The wireless device 14 includes the memory 50 that is configured to store data, programmatic software code and/or other information described herein. In some embodiments, the software and/or the client application may include instructions that, when executed by the processor 48 and/or processing circuitry 46, causes the processor 48 and/or processing circuitry 46 to perform the processes described herein with respect to the wireless device 14. For example, the processing circuitry 46 of the wireless device 14 may include the activation unit 22 that is configured for using an activated reference signal in accordance with the principles of the disclosure.

The wireless device 14 includes the transceiver 52 and the antenna 54. In certain embodiments, some or all of the functionality described as being provided by the wireless devices 14, UEs, MTC or M2M devices, and/or any other types of wireless devices may be provided by the processor 48 executing instructions stored on a computer-readable medium, such as the memory 50. Alternative embodiments may include additional components beyond those shown in FIG. 9 that may be responsible for providing certain aspects of the device's functionality, including any of the functionality described herein.

FIG. 10 is a block diagram of another embodiment of the wireless device 14 in accordance with the principles of the disclosure. The wireless device 14 includes the activation module 56 that is configured to perform one or more corresponding functions. Examples of such functions include various method steps or combinations of method steps as described herein with reference to the wireless device(s) 14 such as with respect to FIG. 13. In general, a module may comprise any suitable combination of software and/or hardware configured to perform the corresponding function. For instance, in some embodiments a module comprises software configured to perform a corresponding function when executed on an associated platform, such as that illustrated in FIG. 9.

Figure 11:
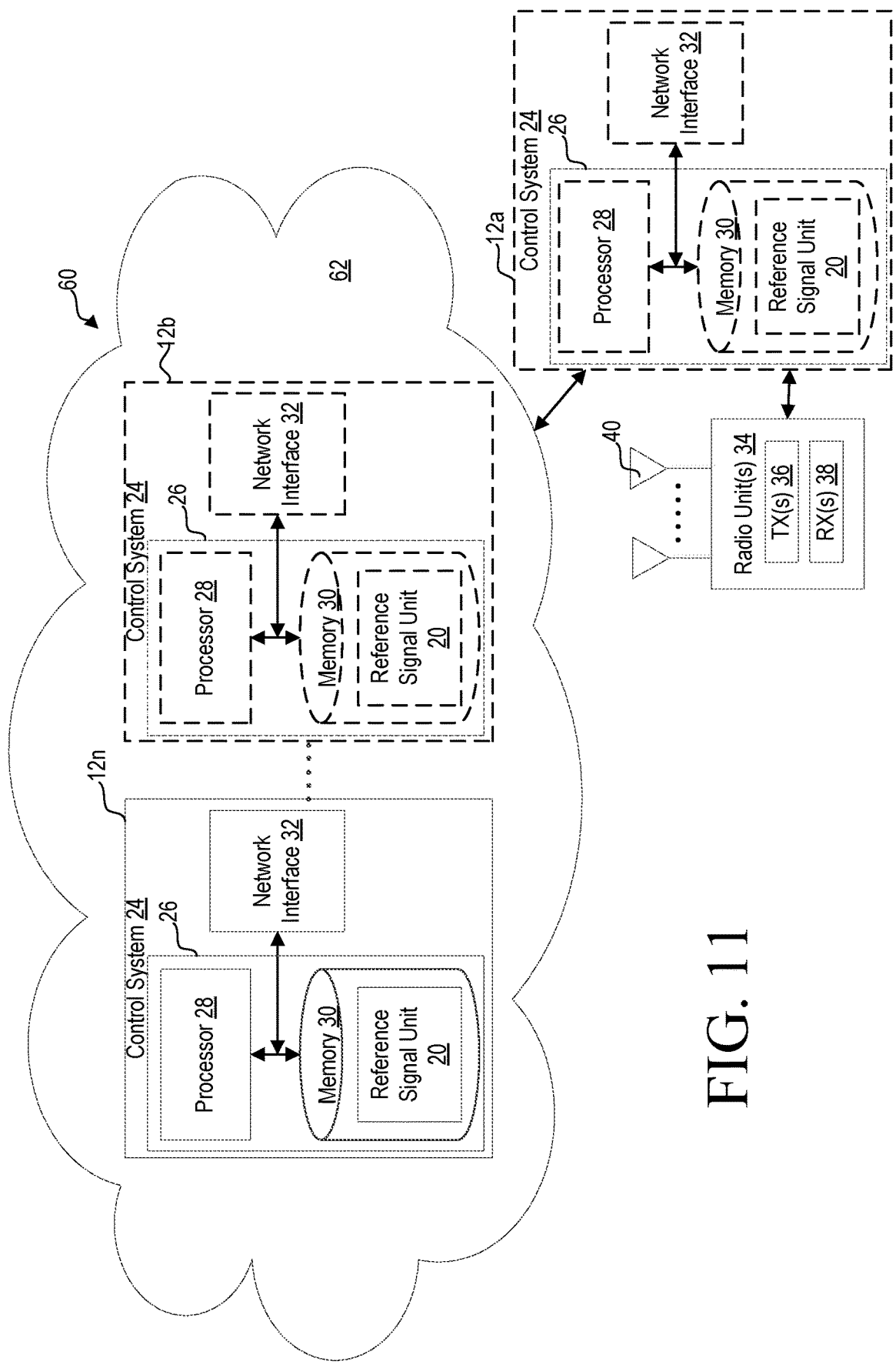
FIG. 11 is a block diagram of a communication system with a virtualized network node in accordance with the principles of the disclosure.

FIG. 11 is a block diagram of a communication system with a virtualized network node 12 in accordance with the principles of the disclosure. The concepts described in relation to FIG. 11 may be similarly applied to other types of the network nodes 12. Further, other types of the network nodes 12 may have similar virtualized architectures. As used herein, the term "virtualized radio access node" refers to an implementation of the network node 12 in which at least a portion of the functionality of the network node 12a is implemented as a virtual component(s) (e.g., via a virtual machine(s) executing on a physical processing node(s) such as one or more of the network nodes 12b-12n in a network(s)).

Referring to FIG. 11, the network node 12a includes the control system 24 as described in relation to FIG. 7. The control system 24 is connected to one or more network nodes 12a-12n coupled to or included as part of the network(s) 62 via the network interface 32. Each network node 12a-12n coupled to or part of the network(s) 62 includes one or more processors 28, memory 30, and a network interface 32, as described herein.

In this example, functions of the network node 12a described herein are implemented at the one or more the network nodes 12b-12n or distributed across the control system 24 of the network node 12a and the one or more the network nodes 12b-2n in any desired manner. In some embodiments, some or all of the functions of the network node 12a described herein are implemented as virtual components executed by one or more virtual machines implemented in a virtual environment(s) hosted by the network nodes 12b-12n. As will be appreciated by one of ordinary skill in the art, additional signaling or communication between the network nodes 12b-12n and the control system 24 of the network node 12a is used in order to carry out at least some of the desired functions. As indicated by dotted lines, in some embodiments, the control system 24 of the network node 12a may be omitted, in which case the radio unit(s) 34 communicate directly with the network node 12b-12n via an appropriate network interface(s).

In some embodiments, a computer program comprises instructions which, when executed by at least one processor, causes at least one processor to carry out the functionality of the network node 12 or another node (e.g., virtualized network node 12b) implementing one or more of the functions of the network node 12 in a virtual environment according to any of the embodiments described herein.

Figure 12:
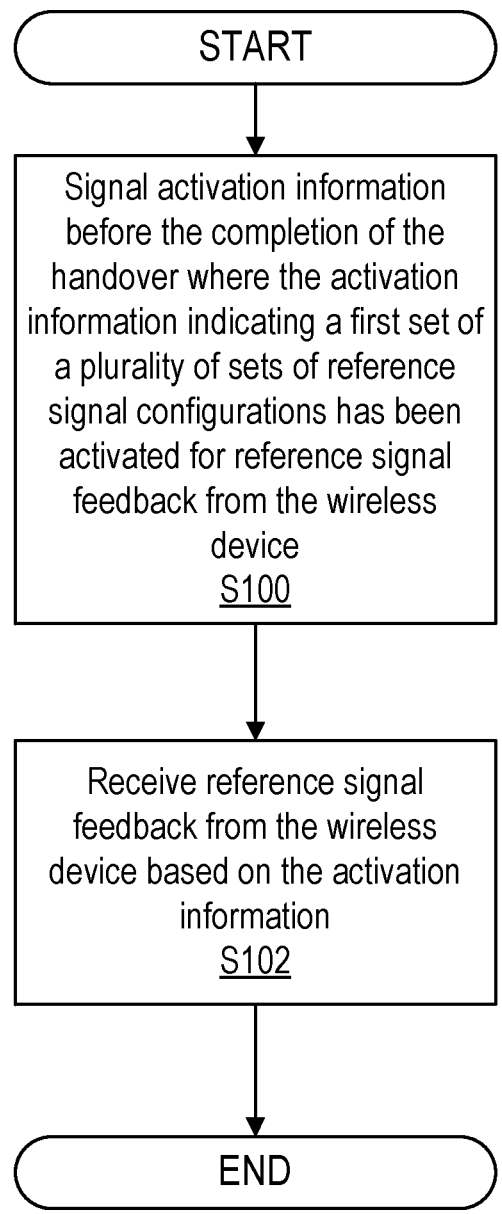
FIG. 12 is a flow diagram of an example reference signal activation process in accordance with the principles of the disclosure.

FIG. 12 is a flow diagram of an example process of the reference signal unit 20 in accordance with the principles of the disclosure. The network node 12 such as via the processing circuitry 26 is configured to signal activation information before the completion of the handover where the activation information indicates a first set of a plurality of sets of reference signal configurations has been activated for reference signal feedback from the wireless device 14, as described herein (block S100). The network node 12 such as via the processing circuitry 26 is configured to receive reference signal feedback from the wireless device 14 based on the activation information, as described herein (block S102).

According to one or more embodiments, the memory 30 stores further instructions that, when executed by the processor 28, further configure the target network node 12 to: determine the plurality of sets of reference signal configurations, and transmit an indication of the plurality of sets of reference signal configurations for the wireless device 14 where the plurality of sets of reference signal configurations are associated with a plurality of antenna beam directions provided by the target network node 12. According to one embodiment of this aspect, the memory 30 stores further instructions that, when executed by the processor 28, further configure the target network node 12 to receive measurement information associated with the wireless device 14 from the serving network node 12. The determining of the plurality of sets of reference signal configurations is based on the measurement information where the plurality of sets of reference signal configurations are confined in a spatial domain associated with the wireless device 14.

According to one embodiment of this aspect, the memory 30 stores further instructions that, when executed by the processor 28, further configure the target network node 12 to: synchronize with the wireless device 14 using a downlink antenna beam associated with the first set of the plurality of sets of reference signal configurations. The activation information indicates the first set of the plurality of sets of reference signal configurations has been activated for reference signal feedback from the wireless device 14. According to one embodiment of this aspect, each of the plurality of sets of reference signal configurations corresponds to a plurality of sets of channel state information reference signal, CSI-RS, configurations where each set of the plurality of sets of CSI-RS configurations corresponding to a plurality of CSI-RS.

According to one embodiment of this aspect, the activation information is a bit of a medium access control, MAC, control element, CE, byte, where the bit of the MAC CE indicating the first set of the plurality of sets of reference signal configurations. According to one embodiment of this aspect, each bit of the MAC CE byte corresponds to a different set of the plurality of reference signal configurations. According to one embodiment of this aspect, the signaling of the activation information is configured to occur during a Radio Access Channel, RACH, procedure with the target network node 12. According to one embodiment of this aspect, signaling the activation information corresponds to one of signaling a Random Access Response, RAR, message and signaling a Radio Resource Control, RRC, connection setup message.

According to one embodiment of this aspect, signaling of the activation information includes signaling the activation information to the serving network node 12 for transmission to the wireless device 14 in handover command message where the handover command message configured to allow the wireless device 14 to access the target network node 12. According to one embodiment of this aspect, signaling of the activation information includes signaling the activation information as part of a radio resource configuration message.

Figure 13:
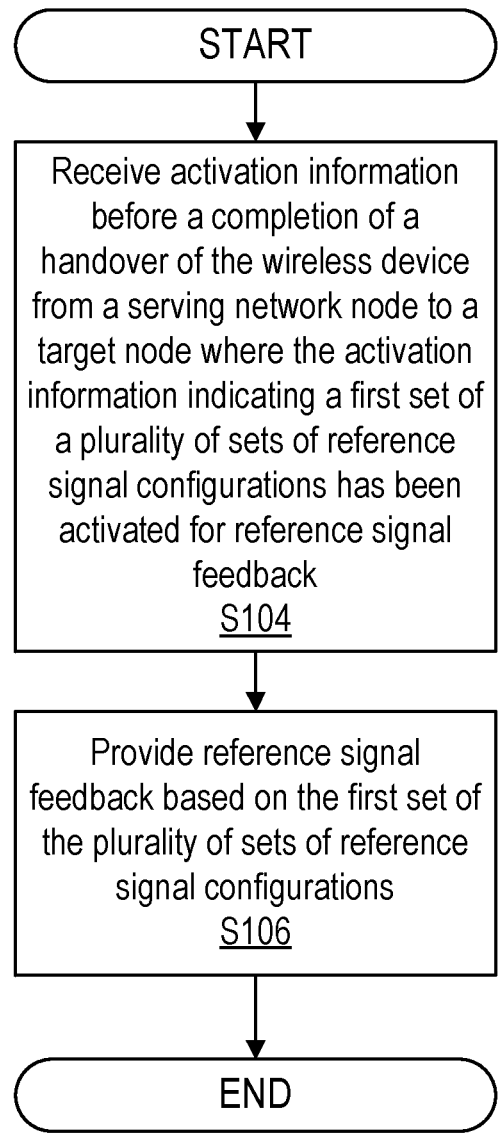
FIG. 13 is a flow diagram of an example reference signal usage process in accordance with the principles of the disclosure.

FIG. 13 is a flow diagram of an example process of the activation unit 22 in accordance with the principles of the disclosure. The wireless device 14 such a via the processing circuitry 46 is configured to receive activation information before a completion of a handover of the wireless device 14 from the serving network node 12 to a target network node 12 where the activation information indicates a first set of a plurality of sets of reference signal configurations has been activated for reference signal feedback, as described herein (block S104). The wireless device 14 such as via the processing circuitry 46 is configured to provide reference signal feedback based on the first set of the plurality of sets of reference signal configurations, as described herein (block S106).

According to one or more embodiments, the memory 50 stores further instructions that, when executed by the processor 48, further configure the wireless device 14 to: receive, in a handover command message, the plurality of sets of reference signal configurations associated with the target network node 12, and in response to the receiving of the plurality of sets of reference signal configurations associated with the target network node 12, monitor for the activation information. In one or more embodiments, one or more indications of the plurality of sets of reference signal configurations associated with the target network node 12 is received. According to one or more embodiments, the memory 50 stores further instructions that, when executed by the processor 48, further configure the wireless device 14 to: receive the plurality of sets of reference signal configurations associated with the target network node 12, select a downlink antenna beam associated with the first set of the plurality of sets of the reference signal configurations, and synchronize with the target network node 12 based on the selected downlink antenna beam associated with the first set of the sets of reference signal configurations where the activation information being based on the synchronization with the target network node 12. According to one embodiment of this aspect, the memory 50 stores further instructions that, when executed by the processor 48, further configure the wireless device 14 to provide at least one measurement report to the serving network node 12. The plurality of sets of reference signal configurations is confined in a spatial domain associated with the wireless device 14 based on the at least one measurement report.

According to one embodiment of this aspect, the plurality of sets of reference signal configurations corresponds to a plurality of sets of channel state information reference signals, CSI-RS, configurations, each set of the plurality of sets of CSI-RS configurations corresponding to a plurality of CSI-RS. According to one embodiment of this aspect, the activation information is received during a Radio Access Channel, RACH, procedure with the target network node 12. According to one embodiment of this aspect, the activation information is associated with a Random Access Response, RAR, message and a Radio Resource Control, RRC, connection setup message.

According to one embodiment of this aspect, the activation information is a bit of a medium access control, MAC, control element, CE, byte, the bit of the MAC CE indicating the first set of the plurality of sets of reference signal configurations. According to one embodiment of this aspect, each bit of the MAC CE byte corresponds to a different set of the plurality of sets of reference signal configurations. According to one embodiment of this aspect, the activation information is received within a handover command message, the handover command message configured to allow the wireless device 14 to access the target network node 12.

According to one embodiment of this aspect, the handover command message is received from the serving network node 12 where the handover command message is received before an initiation of a Radio Access Channel, RACH, procedure with the target network node 12.

Having generally described arrangements for reference signal activation, some examples of these arrangements, functions and processes are provided as follows, which may be implemented by the network node 12 and/or wireless device 14.

Example 1

In one embodiment, upon or after receiving a RRC Reconfiguration message with mobility control info, or equivalent NR HO command including set of aperiodic or semi-persistent CSI-RS resources, the wireless device 14 receives activation information for one or more of the CSI-RS resources within the HO command. The wireless device 14 may use provide reference signal feedback based on the activation information as described herein.

Example 2

In another embodiment, upon receiving a RRC Reconfiguration message with mobility control info, or equivalent NR HO command including a set of aperiodic or semi-persistent CSI-RS resources, the wireless device 14 receives activation information for one or more of the CSI-RS resources in msg2 or msg4 of random access procedure or equivalent NR random access message. The wireless device 14 may use provide reference signal feedback based on the activation information as described herein.

As there may need to be common timing between the network node 12 and the wireless device 14, from which subframe the CSI-RS is activated, from where the exact timing can be predetermined to be, for example, based on the subframe the wireless device 14 receives that is associated with msg2 or msg4, or in NR, based on a specific random access message from the network node 12. If the wireless device 14 has received the activation information before the timing of when the resources are considered activated, the wireless device 14 may have been able to process the HO command and can readily measure the CSI-RS from the subframe from which it was activated.

Example 3

The given MAC CE is defined, for example, as one bit point to a predefined/configured list of CSI-RS resources. In one embodiment, the list is per SSB beam or list is per TRP.

Description of One or More Embodiments with Full HO Procedure

After receiving a Handover Request message from a serving network node 12, the target network node 12 prepares one or multiple set(s) of CSI-RS configurations for an incoming wireless device 14 upon receiving a HO request from serving network node 12. In one or more embodiments, each CSI-RS configuration corresponds to a respective CSI-RS.

Figure 14:
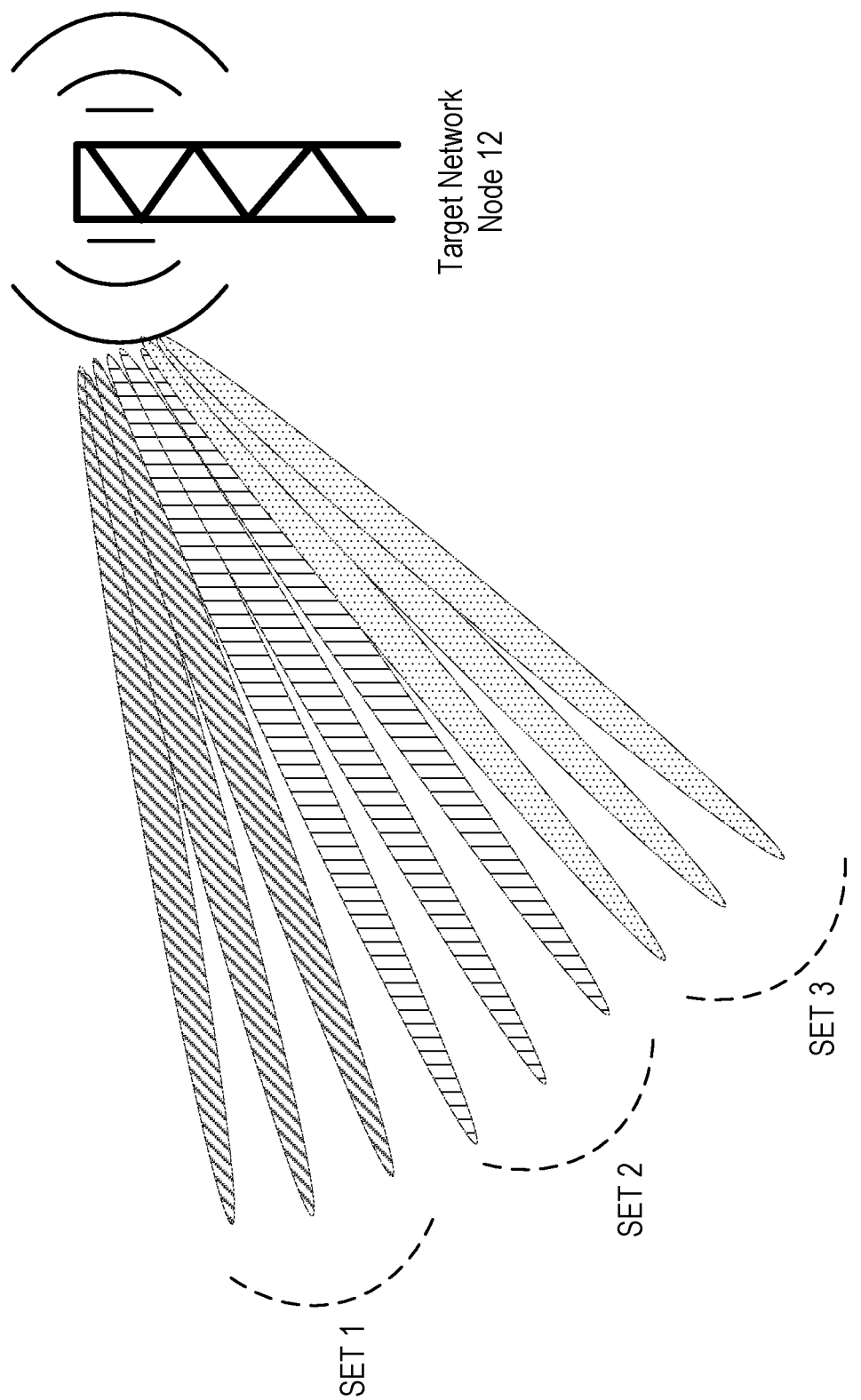
FIG. 14 is a diagram of example transmission sets of reference signal configuration in accordance with the principles of the disclosure.

The target network node 12 can select all possible or a plurality of sets of CSI-RSs that cover the entire cell in a full beam sweep, where each set could be a beam set partitioning across the cell. The concept of partitioning the set(s) of CSI-RS configurations or resources is illustrated in FIG. 14. Although three sets are shown, the disclosure can be equally applicable to more or less than three sets.

If the serving network node 14 has received measurement reports from the wireless device 14 containing information about beam measurements from the target network node 12, such as best beam indications (based on beam/time indexes on the SS Block) and/or RSRP/RSRQ per beam, the serving network node 12 can include that information in the Handover request to be transmitted to the target network node 12. By receiving that information, the target network node 12 can select a set of CSI-RS configurations confined in the spatial domain instead of providing a set of CSI-RS configurations associated to the whole cell (which may include multiple TRPs.). The Handover Request may also contain Quality of Service (QoS) related information such as to allow the target network node 12 to be able to determine that the wireless device 14 may require beam refinement once connected to it, at least for one bearer.

STEP 2: After the target network node 12 prepares the configurations for the sets of CSI-RSs for an incoming wireless device, the target network node 12 provides the configurations as part of the RRC configuration and as part of the Handover Acknowledgement. That is conveyed with an index for each of the sets.

Figure 15:
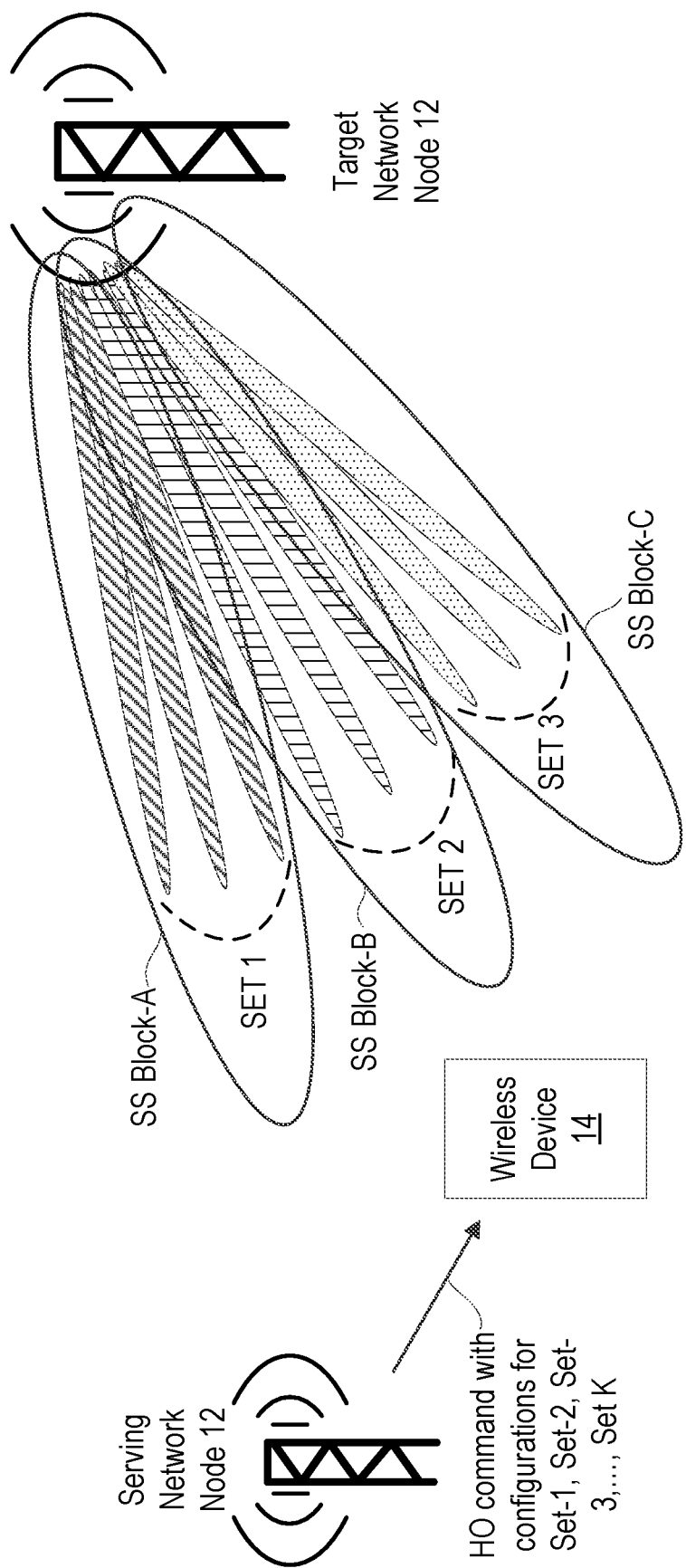
FIG. 15 is a diagram of other example transmission sets of reference signal configuration in accordance with the principles of the disclosure.

STEP 3: The source network node 12 provides the set(s) of CSI-RS configuration as part of the RRC configuration to wireless device 14 in the Handover Command (e.g. an RRC Connection Reconfiguration message with the information element including mobility control information) as illustrated in FIG. 15. The handover command message includes at least cell ID and information that may be used to access the target cell so that wireless device 14 can access the target cell/network node 12 without reading system information.

STEP 4: Upon receiving the RRC Connection Reconfiguration message that includes mobility control information containing/indicating, among other parameters, the one or multiple set(s) of CSI-RS configurations, i.e., the pool of CSI-RS(s), wireless device 14 assumes that these sets are suspended, i.e., not activated. Wireless device 14 may also receive dedicated RACH configuration for contention-free random access, e.g., dedicated preamble per wide DL beam (i.e., the beams transmitting SS Blocks).

Figure 16:
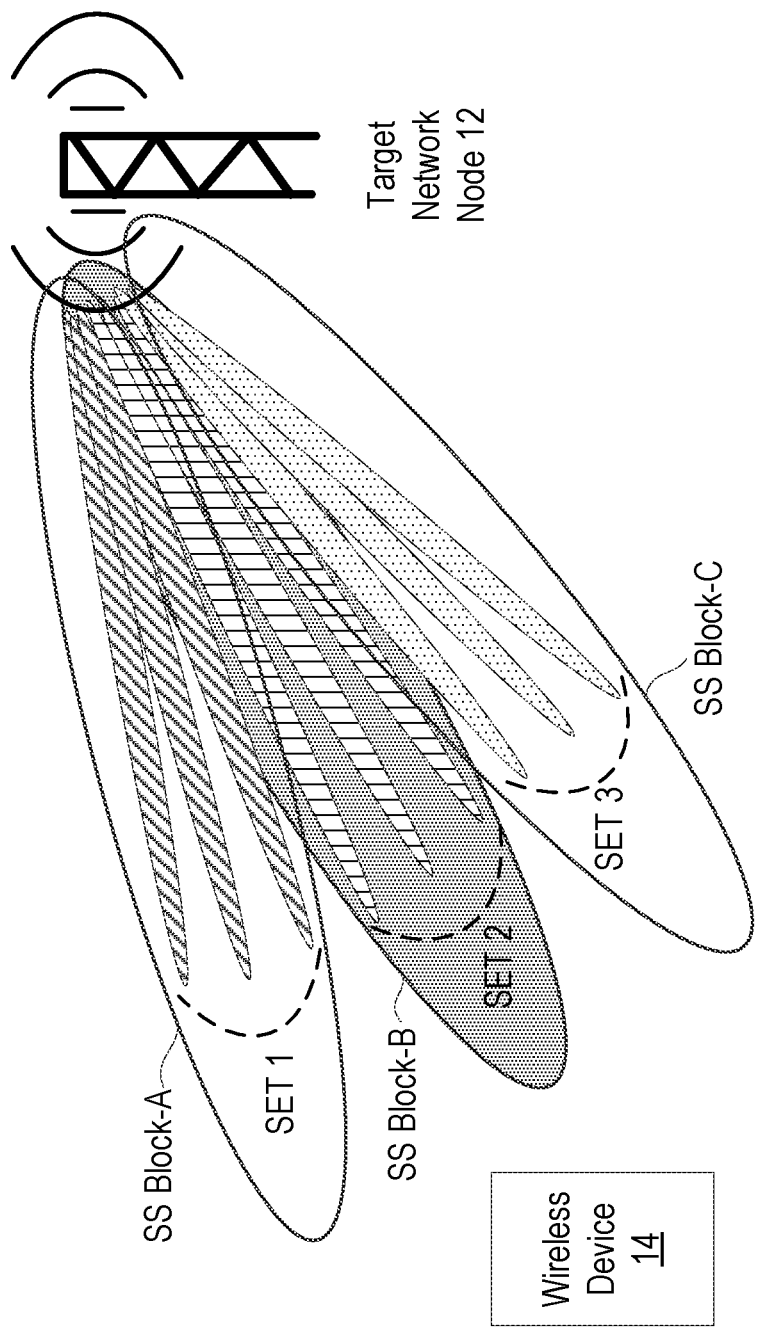
FIG. 16 is a diagram of other example transmission sets of reference signal configuration in accordance with the principles of the disclosure.

As shown in FIG. 16, upon or after receiving the RRC Connection Reconfiguration message, the wireless device 14 selects the best SS Block beam transmitted by the target network node 12 and transmits the RACH preamble to that selected DL beam transmitting the SS block. "Best" as used herein may correspond to a beam having the greater signal characteristic(s) and/or lower signal characteristic(s) when compared to other beams, e.g., greater receive signal power, lower noise, etc.

Figure 17:
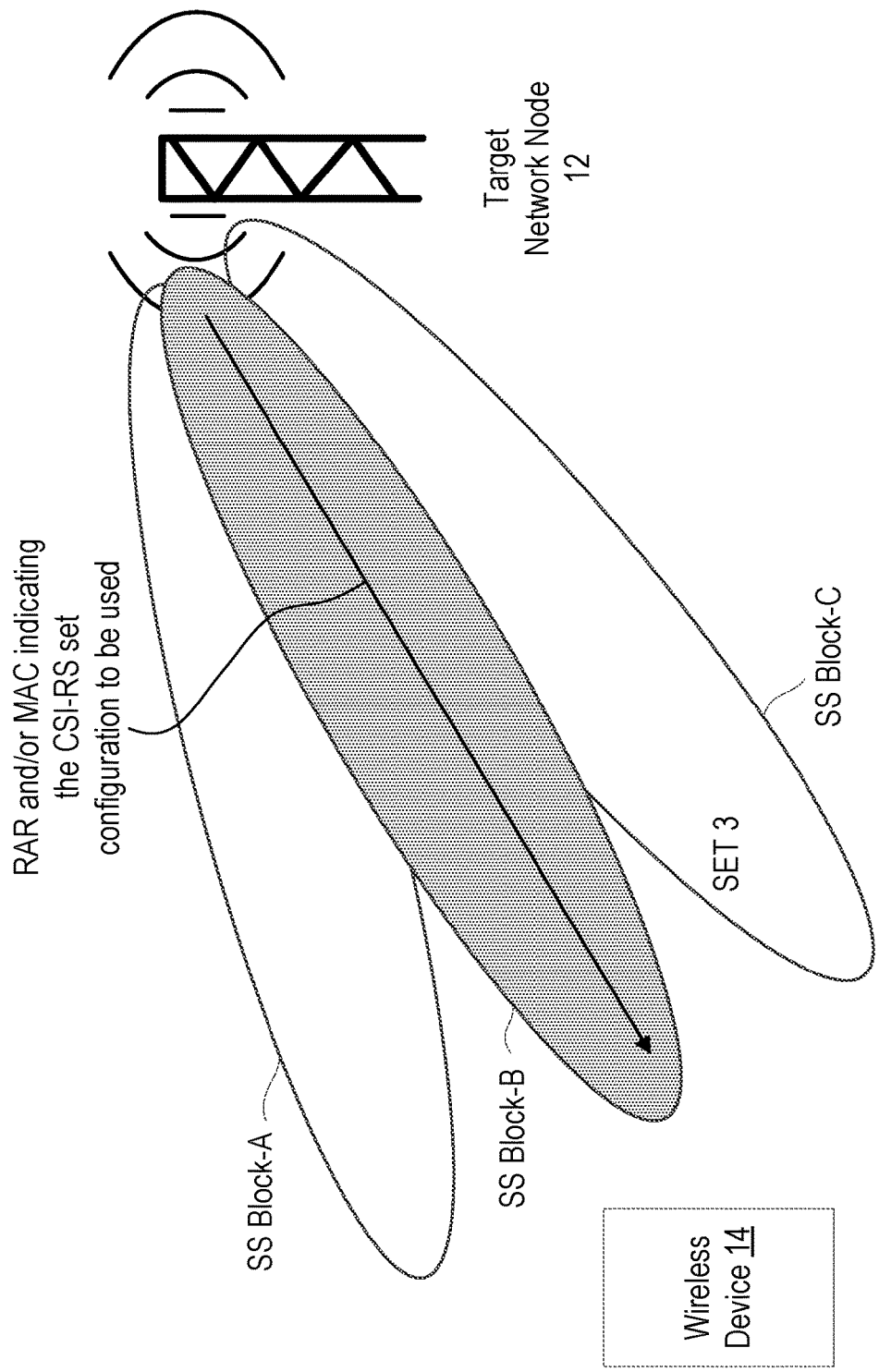
FIG. 17 is a diagram of other example transmission sets of reference signal configuration in accordance with the principles of the disclosure.

STEP 5: Upon receiving the RACH preamble from the wireless device 14, the target network node 12 is able to determine which the wireless device 14 this is, i.e., is able to identifying the wireless device 14, and the wireless device 14's pool or set of CSI-RS configurations, which have been previously prepared by the target network node 12 when the target network node 12 received the HO request from the serving gNodeB and responded to the HO request with a selection of a set of CSI-RS configurations. Upon or in response to detecting the RACH preamble, the target network node 12 is also able to determine which downlink (DL) SSB wide beam wireless device 14 has detected as its best DL SSB wide beam (e.g., best DL SSB according to at least one predefined criterion for ranking the beams), and based on the determination of the best DL SSB wide beam, the target network node 12 selects at least one set of CSI-RS configurations from the pool (e.g., plurality of sets of CSI-RS configurations) that were indicated or provided to that incoming wireless device 14. The selection can be performed based on the knowledge of the overlapping coverage of a certain set of CSI-RS resources and the wide SS Block beams. After selecting at least one of the sets of CSI-RS resources or configurations, the target network node 12 sends a Random Access Response to the wireless device 14 (or a Message 2 (msg2) multiplexed with the RAR on MAC level, e.g., a MAC Control Element) to indicate a successful preamble detection. This is illustrated in FIG. 17.

In addition, either the RAR itself or another MAC CE message multiplexed with the RAR may indicate to the wireless device 14 the set of CSI-RS configurations that may be activated from the pool (e.g., plurality of sets of CSI-RS configurations). That message may contain the index previously provided to wireless device 14 as part of the pool (e.g., plurality of sets of CSI-RS configurations) mapping to index.

Figure 18:
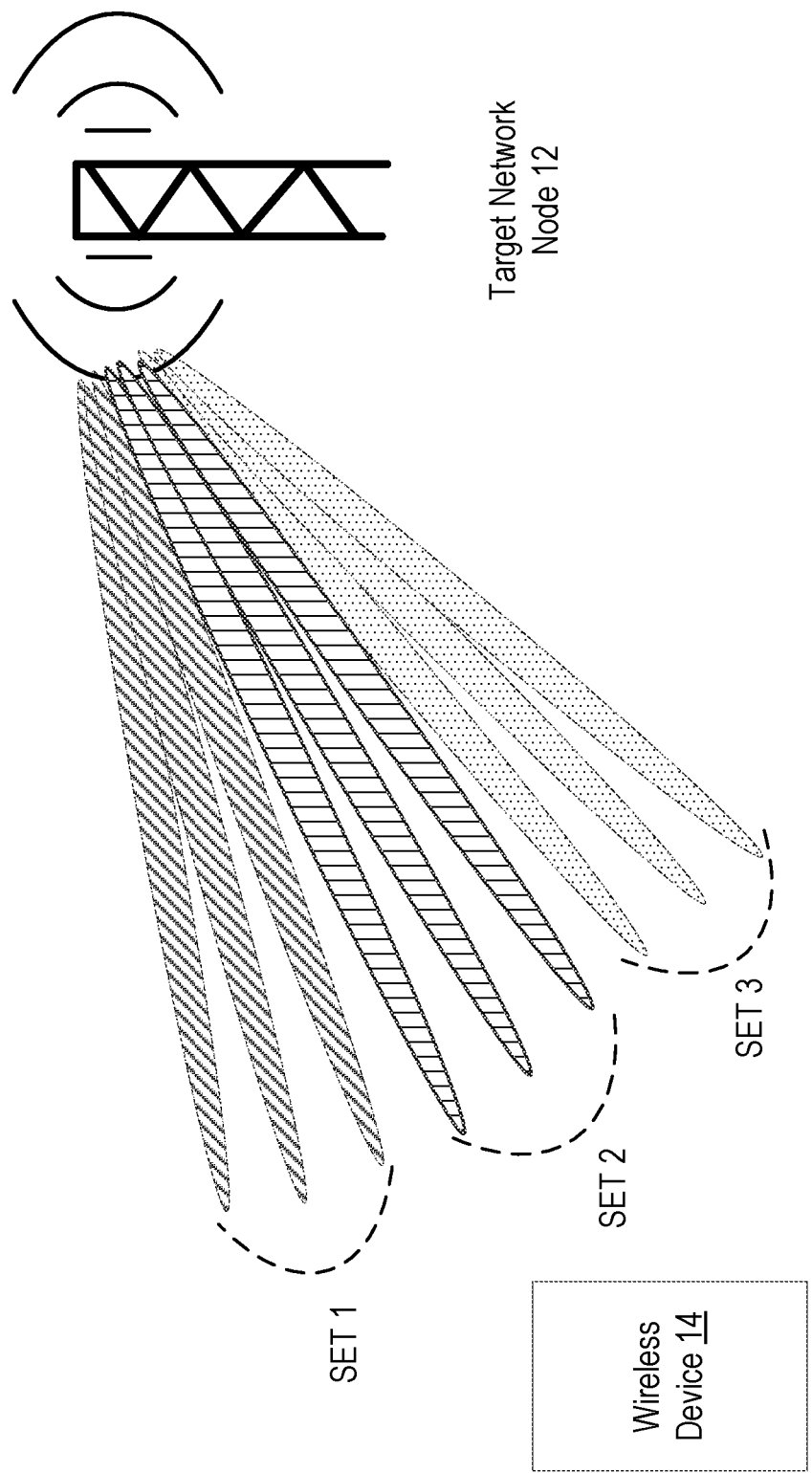
FIG. 18 is a diagram of another example transmission sets of reference signal configuration in accordance with the principles of the disclosure.

Upon detecting the preamble and selecting the set of CSI-RSs configurations for the incoming wireless device 14, the target network node 12 starts transmitting the set of the CSI-RS configurations that target network node 12 has selected, if these are not yet being transmitted, as illustrated in FIG. 18. The dashed lines indicated the CSI-RS configurations that were not selected.

STEP 6: Upon receiving the message indicating the MAC CE, the wireless device 14 should assume the indicated CSI-RS configuration(s) to be activate and start to act according to corresponding configuration, e.g., start to generated CSI-RS feedback.

The indexing indicating the one or more CSI-RS configurations may be encoded as the C-RNTI or any other identifier in Message 2 (e.g., Random Access Response) since the C-RNTI may not be used for contention resolution in the contention-free random access. In one or more embodiments, the MAC CE may be included in the HO command and in a random access message during the RACH procedure. Therefore, the C-RNTI is advantageously used for at least one functions other than contention resolution.

The described embodiments may be implemented in any appropriate type of communication system supporting any suitable communication standards and using any suitable components. As one example, certain embodiments may be implemented in a communication system such as that illustrated in FIG. 6.

In one or more embodiments described herein, a method of activating a HO command is as follows. Wireless device 14 receives a RRC reconfiguration message with mobility control information or an equivalent NR HO command indicating a set of aperiodic or semi-persistent CSI-RS resources or configurations. In one or more embodiments, the one or more CSI-RS resources are indicated within the HO command. In one or more embodiments, the one or more CSI-RS resources or configurations are indicated in message 2 (msg2) or message 4 (msg4) of a random access procedure or equivalent NR random access message. In one or more embodiments, the CSI-RS configuration may correspond to one or more CSI-RS resources.

In one or more embodiments, another method of preparing one or multiple set(s) of CSI-RS configurations for an incoming wireless device 14 upon or in response to receiving a HO request from the serving network node 12 is provided. After receiving a HO request from the serving network node 12, target network node 12 prepares one or multiple sets of CSI-RS. Target network node 12 selects possible sets of CSI-RSs, i.e., CSI-RS resources or configurations that cover a cell in a full beam sweep. If the serving network node 12 has measurement reports from the wireless device 14 with beam measurements from target the network node 12, the serving network node 12 includes the measurement reports, i.e., measurement information, in HO request to the target network node 12. HO request may also contain Quality of Service (QoS) information for the target network node 12 refinement of the antenna beam for communicating with wireless device 14.

In one or more embodiments, another method of preparing one or multiple set(s) of CSI-RS configurations for an incoming wireless device 14 upon or in response to receiving a HO request from the serving network node 12 is provided. The target network node 12 provides an indication of a set of CSI-RSs, i.e., CSI-RS resources or configurations, for an incoming wireless device 14 as part of RRC configuration and HO acknowledgment. The serving network node 12 provides the configurations such as an indication of the configurations to the wireless device 14 in a handover command and may include a cell ID for the wireless device 14 to access the target network node 12. Upon or in response to receiving the information/indication, wireless device 14 assumes that the sets or configurations are suspended or not activated. The wireless device 14 receives dedicated RACH configuration for contention-free random access. The wireless device 14 selects a best SS Block beam upon receiving the dedicated RACH configuration and transmits a RACH preamble. In one or more examples, the "best" SS Block beam may corresponds to a beam with the signal characteristics better than at least one other beam.

In one or more embodiments, another method of preparing one or multiple set(s) of CSI-RSs, i.e., CSI-RS resources or configurations, for an incoming wireless device 14 upon or in response to receiving a HO request from serving network node 12 is provided. Upon receiving a RACH preamble from the wireless device 14, the target network node 12 identifies the wireless device 14 such as identifier the wireless device 14 as the wireless device 14 that was provided with an indication of multiple CSI-RS configurations. Upon detecting the RACH preamble, the target network node 12 identifies the DL SSB wide beam that wireless device 14 has detected as its best beam. For example, the wireless device may transmit the RACH preamble associated with the selected best beam. The target network node 12 selects at least one of the CSI-RS configurations from a plurality of CSI-RS configuration that were provided to the wireless device 14 such as via the HO command. The target network node 12 sends a RAR message to the wireless device 14 to indicate successful preamble detection. The wireless device 14 determines a set of CSI-RS configurations to be activated from the plurality of CSI-RS configurations based on the RAR message or other MAC CE message multiplexed with the RAR message. The target network node 12 starts transmitting a set of CSI-RS that the target network node 12 selected upon or in response to detecting/receiving a preamble and selected set of CSI-RS for an incoming wireless device 14.

In one or more embodiments, another method of preparing one or multiple set(s) of CSI-RSs, i.e., CSI-RS resources or configurations, to an incoming wireless device 14 upon or in response to receiving a HO request from the serving network node 12 is provided. Upon or in response to detecting a message, the wireless device 14 assumes that the indicated CSI-RS configuration(s) are activated and the wireless device 14 may proceed with providing feedback based on the CSI-RS. In one or more embodiments, indexing indicating the one or more CSI-RS configurations that have been or are to be activated may be encoded as C-RNTI or any other identifier in message 2 of the RACH procedure/process.

The methods and/or processes described above may be performed by an apparatus such as that illustrated in any of FIGS. 6-11, for instance. Additionally, the methods may be performed in conjunction with any of various alternative features as described above.

Figure 19:
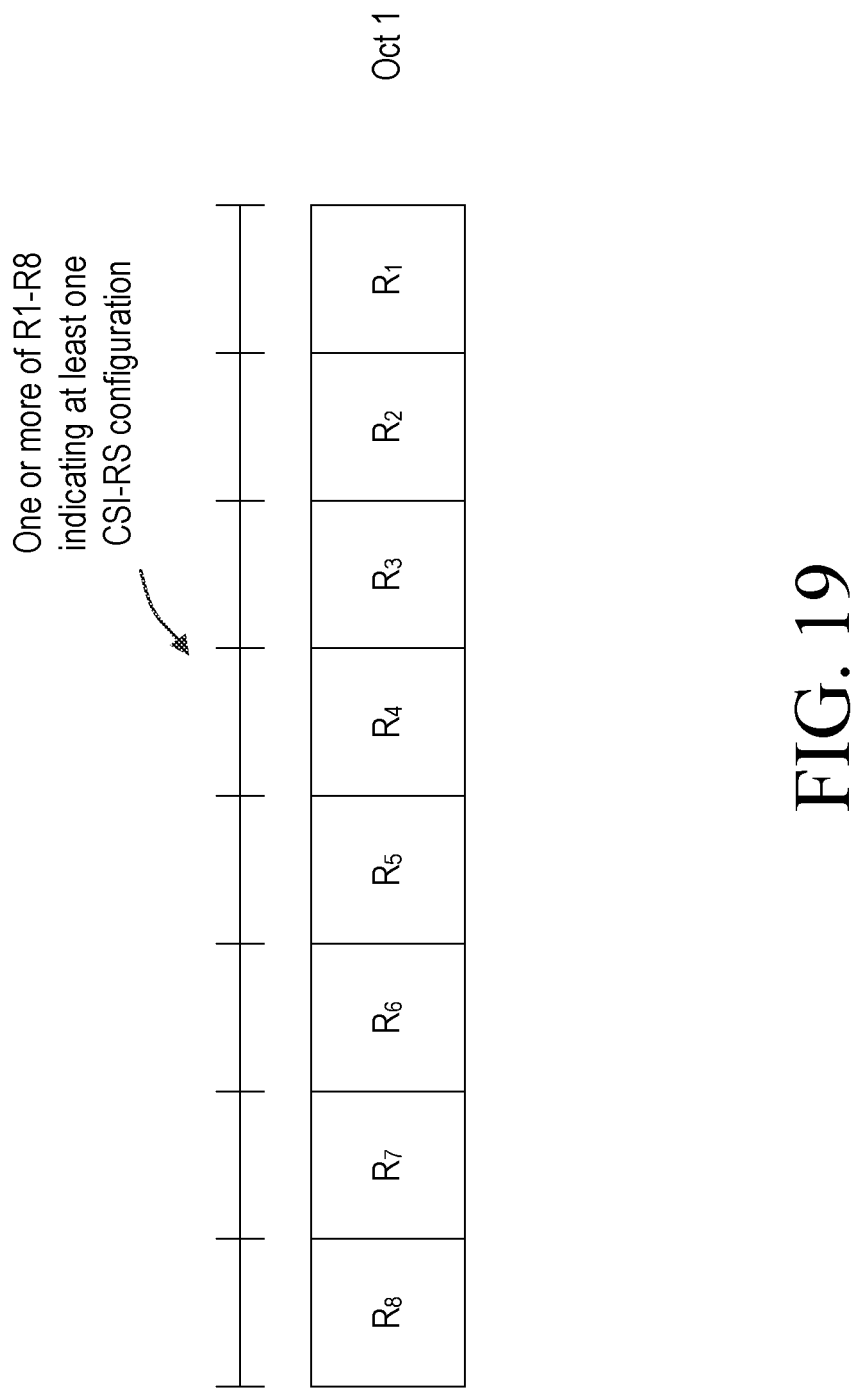
FIG. 19 is a diagram of a MAC CE octet in accordance with the principles of the disclosure.

In one example, the MAC CE is provided with one bit inside the octet shown in FIG. 19. The bit points to a set of CSI-RSs, i.e., CSI-RS resources or configurations. In one embodiment, one bit points to all CSI-RSs configured for quasi-colocation mapping to a specific SSB. In another embodiment, one or more bits of the MAC CE are mapped to a separate set of lists of CSI-RS configurations where each bit in the MAC CE points to one set which includes a list of CSI-RS configurations. This definition for or configuration of the MAC CE can also be used in network operations other than in HO. In one or more embodiments, the CSI-RS is an aperiodic and/or a semi persistent CSI-RS for aperiodic and/or semi-persistent CSI reporting that may happen from periodic, semi-persistent or aperiodic CSI-RS with certain limitations.

Some Other Examples

Example 1. A method of configuring a set of Channel State Information Reference Signals for beamforming management in a handover command, comprising:

selecting a set of CSI-RS based on physical random access channel preamble information of a UE 14;

forwarding the set of CSI-RS to the UE 14 as part of an Radio Resource Control configuration message and handover acknowledgment.

Example 2. A method according to Example 1, wherein the CSI-RS is activated prior to handover completion.

Example 3. A method according to Example 2, wherein the CSI-RS is activated via a Medium Access Control Element (MAC-CE).

Example 4. A method according to Example 3, wherein the MAC-CE is included in the HO command.

Example 5. A method according to Example 4, wherein the MAC-CE is included in a random access message.

Example 6. A method according to Example 3, wherein includes a predetermine bit in the MAC-CE points to a set of CSI-RS.

The following is a list of acronyms that may be used in this written description.

CE Control Element
CSI Channel State Information
CSI-RS CSI Reference Signal
DMRS Demodulation Reference Signal
HO Handover
MAC Medium Access Control
MAC-CE MAC Control Element
NR New Radio
PBCH Physical Broadcast Channel
PDSCH Physical Downlink Shared Channel
PRACH Physical Random Access Channel
RAR Radom Access Response
RRC Radio Resource Control As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device for wireless communications, the wireless device comprising:
processing circuitry including a processor and a memory, the memory configured to store instructions that, when executed by the processor, configure the wireless device to:
receive a plurality of beams from the target network node;
select a first beam of the plurality of beams;
transmit a Random Access Channel, RACH, preamble message to the target node on the selected first beam to indicate the selection by the wireless device;
receive activation information before a completion of a handover of the wireless device from a serving network node to a target network node, the activation information indicating a first set of a plurality of sets of reference signal configurations has been activated for the selected first beam for reference signal feedback, the activation information being received during a RACH procedure with the target network node; and
provide reference signal feedback based on the first set of the plurality of sets of reference signal configurations.

2. The wireless device of claim 1, wherein the memory stores further instructions that, when executed by the processor, further configure the wireless device to:
receive, in a handover command message, the plurality of sets of reference signal configurations associated with the target network node; and
in response to the receiving of the plurality of sets of reference signal configurations associated with the target network node, monitor for the activation information.

3. The wireless device of claim 2, wherein the memory stores further instructions that, when executed by the processor, further configure the wireless device to provide at least one measurement report to the serving network node; and
the plurality of sets of reference signal configurations being confined in a spatial domain associated with the wireless device based on the at least one measurement report.

4. The wireless device of claim 1, wherein the plurality of sets of reference signal configurations corresponds to a plurality of sets of channel state information reference signals, CSI-RS, configurations, each set of the plurality of sets of CSI-RS configurations corresponding to a plurality of CSI-RS.

5. The wireless device of claim 1, wherein the activation information is associated with a Random Access Response, RAR, message or a Radio Resource Control, RRC, connection setup message.

6. The wireless device of claim 1, wherein the activation information is a bit of a medium access control, MAC, control element, CE, byte, the bit of the MAC CE indicating the first set of the plurality of sets of reference signal configurations.

7. The wireless device of claim 6, wherein each bit of the MAC CE byte corresponds to a different set of the plurality of sets of reference signal configurations.

8. A method in a wireless device for wireless communications, the method comprising:
receiving a plurality of beams from the target network node;
selecting a first beam of the plurality of beams;
transmitting a Random Access Channel, RACH, preamble message to the target node on the selected first beam to indicate the selection by the wireless device;
receiving activation information before a completion of a handover of the wireless device from a serving network node to a target network node, the activation information indicating a first set of a plurality of sets of reference signal configurations has been activated for the selected first beam for reference signal feedback, the activation information being received during a RACH procedure with the target network node; and providing reference signal feedback based on the first set of the plurality of sets of reference signal configurations.

9. The method of claim 8, further comprising:

receiving, in a handover command message, the plurality of sets of reference signal configurations associated with the target network node; and in response to the receiving of the plurality of sets of reference signal configurations associated with the target network node, monitoring for the activation information.

10. The method of claim 9, further comprising providing at least one measurement report to the serving network node; and the plurality of sets of reference signal configurations being confined in a spatial domain associated with the wireless device based on the at least one measurement report.

11. The method of claim 8, wherein the plurality of sets of reference signal configurations corresponds to a plurality of sets of channel state information reference signals, CSI-RS, configurations, each set of the plurality of sets of CSI-RS configurations corresponding to a plurality of CSI-RS.

12. The method of claim 8, wherein the activation information is associated with one of a Random Access Response, RAR, message and a Radio Resource Control, RRC, connection setup message.

13. The method of claim 8, wherein the activation information is a bit of a medium access control, MAC, control element, CE, byte, the bit of the MAC CE indicating the first set of the plurality of sets of reference signal configurations.

14. The method of claim 13, wherein each bit of the MAC CE byte corresponds to a different set of the plurality of sets of reference signal configurations.

15. A target network node configured to enable reference signal configuration activation before completion of a handover of a wireless device from a serving network node, the target network node comprising:

processing circuitry including a processor and a memory, the memory configured to store instructions that, when executed by the processor, configure the target network node to:

transmit a plurality of beams to the wireless device;

receive, on a selected first beam selected from the plurality of beams, a Random Access Channel, RACH, preamble message from the wireless device indicating the selected first beam;

signal activation information before the completion of the handover, the activation information indicating a first set of a plurality of sets of reference signal configurations has been activated for the selected first beam for reference signal feedback from the wireless device, the signaling of the activation information being configured to occur during a RACH procedure with the wireless device; and receive reference signal feedback from the wireless device based on the activation information.

16. The target network node of claim 15, wherein the memory stores further instructions that, when executed by the processor, further configure the target network node to:

determine the plurality of sets of reference signal configurations; and transmit an indication of the plurality of sets of reference signal configurations for the wireless device, the plurality of sets of reference signal configurations being associated with a plurality of antenna beam directions provided by the target network node.

17. The target network node of claim 16, wherein the memory stores further instructions that, when executed by the processor, further configure the target network node to receive measurement information associated with the wireless device from the serving network node; and the determining of the plurality of sets of reference signal configurations being based on the measurement information where the plurality of sets of reference signal configurations are confined in a spatial domain associated with the wireless device.

18. The target network node of claim 15, wherein the memory stores further instructions that, when executed by the processor, further configure the target network node to:

synchronize with the wireless device using a downlink antenna beam associated with the first set of the plurality of sets of reference signal configurations; and the activation information indicating the first set of the plurality of sets of reference signal configurations has been activated for reference signal feedback from the wireless device.

19. The target network node (12) of claim 15, wherein each of the plurality of sets of reference signal configurations corresponds to a plurality of sets of channel state information reference signal, CSI-RS, configurations, each set of the plurality of sets of CSI-RS configurations corresponding to a plurality of CSI-RS.

20. The target network node of claim 15, wherein the activation information is a bit of a medium access control, MAC, control element, CE, byte, the bit of the MAC CE indicating the first set of the plurality of sets of reference signal configurations.

21. The target network node of claim 20, wherein each bit of the MAC CE byte corresponds to a different set of the plurality of reference signal configurations.

22. The target network node of claim 15, wherein signaling the activation information corresponds to one of signaling a Random Access Response, RAR, message and signaling a Radio Resource Control, RRC, connection setup message.

23. A method in a target network node configured to enable reference signal configuration activation before completion of a handover of a wireless device from a serving network node, the method comprising:

transmitting a plurality of beams to the wireless device;

receiving, on a selected first beam selected from the plurality of beams, a Random Access Channel, RACH, preamble message from the wireless device indicating the selected first beam;

signaling activation information before the completion of the handover, the activation information indicating a first set of a plurality of sets of reference signal configurations has been activated for the selected first beam for reference signal feedback from the wireless device, the signaling of the activation information being configured to occur during a RACH procedure with the wireless device; and receiving reference signal feedback from the wireless device based on the activation information.

24. The method of claim 23, further comprising:

determining the plurality of sets of reference signal configurations; and transmitting an indication of the plurality of sets of reference signal configurations for the wireless device, the plurality of sets of reference signal configurations being associated with a plurality of antenna beam directions provided by the target network node.

25. The method of claim 24, further comprising receiving measurement information associated with the wireless device from the serving network node; and
the determining of the plurality of sets of reference signal configurations being based on the measurement information where the plurality of sets of reference signal configurations are confined in a spatial domain associated with the wireless device.

26. The method of claim 23, further comprising synchronizing with the wireless device using a downlink antenna beam associated with the first set of the plurality of sets of reference signal configurations; and
the activation information indicating the first set of the plurality of sets of reference signal configurations has been activated for reference signal feedback from the wireless device.

27. The method of claim 23, wherein each of the plurality of sets of reference signal configurations corresponds to a plurality of sets of channel state information reference signal, CSI-RS, configurations, each set of the plurality of sets of CSI-RS configurations corresponding to a plurality of CSI-RS.

28. The method of claim 23, wherein the activation information is a bit of a medium access control, MAC, control element, CE, byte, the bit of the MAC CE indicating the first set of the plurality of sets of reference signal configurations.

29. The method of claim 28, wherein each bit of the MAC CE byte corresponds to a different set of the plurality of reference signal configurations.

30. The method of claim 23, wherein signaling the activation information corresponds to one of signaling a Random Access Response, RAR, message and signaling a Radio Resource Control, RRC, connection setup message.

* * * * *